United States Patent [19]
Ichimaru

[11] Patent Number: 5,944,153
[45] Date of Patent: Aug. 31, 1999

[54] SUSPENSION CONTROL SYSTEM

[75] Inventor: Nobuyuki Ichimaru, Kanagawa-ken, Japan

[73] Assignee: Tokico Ltd., Kawasaki-shi, Japan

[21] Appl. No.: 08/939,817

[22] Filed: Sep. 29, 1997

[30] Foreign Application Priority Data

Oct. 4, 1996 [JP] Japan .................................. 8-283107

[51] Int. Cl.⁶ ........................................................ F16F 9/46
[52] U.S. Cl. .................................... 188/299.1; 280/5.515
[58] Field of Search ............................ 280/5.515, 5.504, 280/5.513; 188/280, 299.1; 267/64.16

[56] References Cited

U.S. PATENT DOCUMENTS

| | | | |
|---|---|---|---|
| 5,425,436 | 6/1995 | Teramura | 188/280 |
| 5,559,701 | 9/1996 | Shimizu | 280/707 |
| 5,890,081 | 3/1999 | Sasaki | 280/5.515 |

FOREIGN PATENT DOCUMENTS

| | | |
|---|---|---|
| 41 39 690 A1 | 6/1992 | Germany . |
| 42 32 221 A1 | 4/1993 | Germany . |
| 4-191109 | 7/1992 | Japan . |

*Primary Examiner*—Robert J. Oberleitner
*Assistant Examiner*—Hargobind S Sawhney
*Attorney, Agent, or Firm*—Wenderoth, Lind & Ponack, L.L.P.

[57] ABSTRACT

The disclosed suspension control system includes actuators for adjusting damping forces of front and rear variable-damping force shock absorbers. Also provided are front and rear vertical acceleration detecting devices. Usual control for the actuators are performed on the basis of the vertical accelerations detected by the vertical acceleration detecting devices. Control signal adjusting means is provided to adjust a control signal to be sent to the actuator for the rear shock absorber such that the damping force of the rear shock absorber is reduced when the vertical acceleration detected by the front vertical acceleration detecting device or a rate of change thereof exceeds a preset reference value.

3 Claims, 20 Drawing Sheets

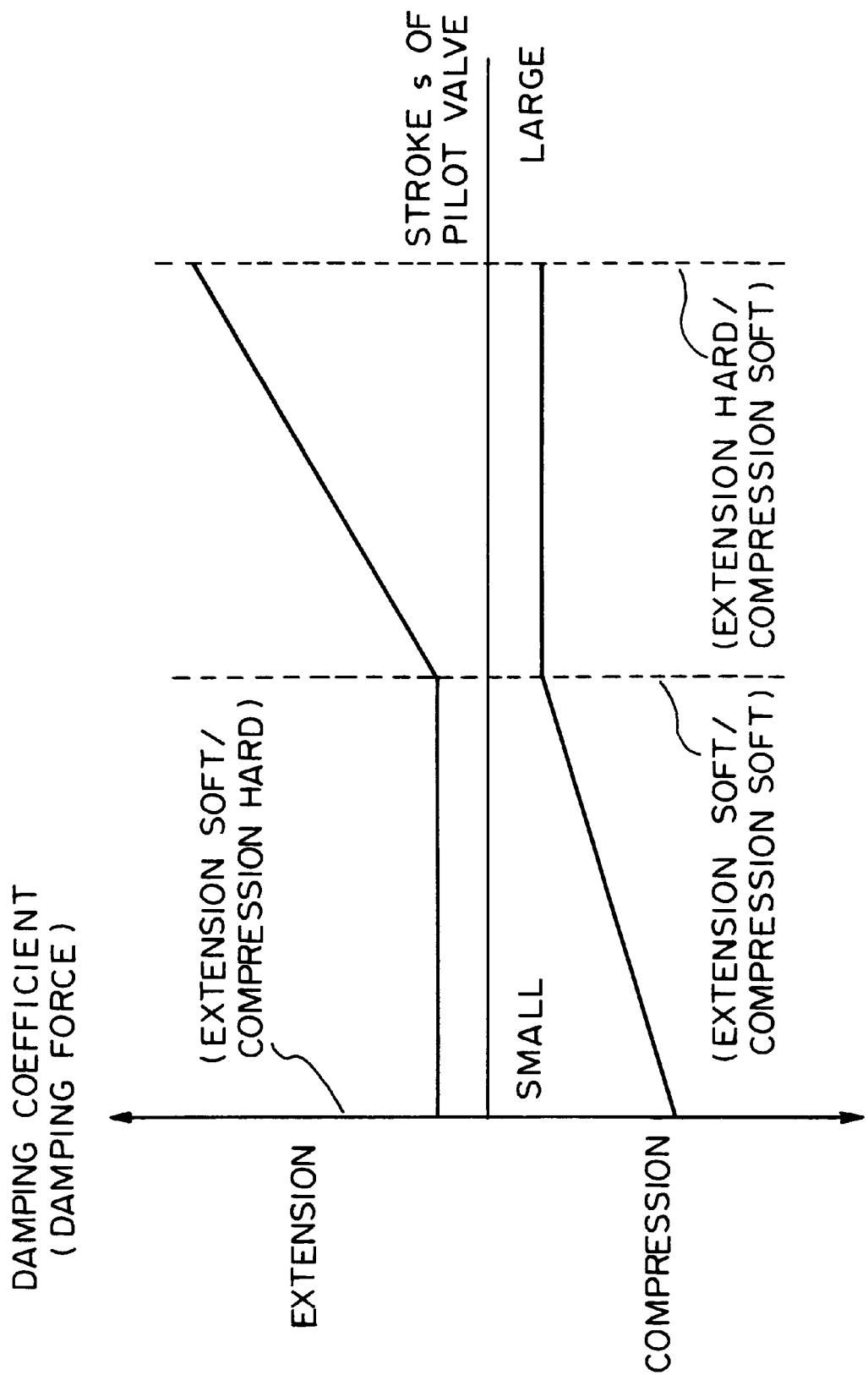

SUSPENSION CONTROL SYSTEM

BACKGROUND OF THE INVENTION

The present invention relates to a suspension control system for use in vehicles.

One example of conventional suspension control systems is disclosed in Japanese Patent Application Unexamined Publication Number (hereinafter referred to as "JP(A)") 5-330325 (U.S. Pat. No. 5,533,597). According to the prior art, at the beginning of going up an undulation of the road surface (i.e. the surface of a paved road that has a series of gentle undulations), the vehicle body is displaced upwardly, and the shock absorber is compressed. The system has been arranged such that the damping coefficient at this time is set to a value that provides "hard" damping force characteristics for the extension stroke and "soft" damping force characteristics for the compression stroke (hereinafter referred to as "extension hard/compression soft characteristics"). Therefore, the road surface change is unlikely to be transmitted to the vehicle body, and a favorable ride quality is obtained. However, on the way to the top of the undulation, the shock absorber begins to extend by the action of the spring compressed when the vehicle began to go up the undulation, causing the vehicle body to move upwardly at a relatively high velocity in cooperation with the inertia acting on the vehicle body as the vehicle goes up the undulation. Even after the vehicle has passed the top of the undulation, the shock absorber remains in the extension hard/compression soft characteristic conditions and is therefore difficult to extend. Accordingly, the vehicle body is pulled downwardly by the unsprung load, and the downward acceleration acting on the vehicle body increases. Consequently, the occupant of the vehicle may feel uncomfortable, having a sensation of being thrown out upwardly.

At the beginning of going down an undulation of the road surface, the vehicle body is displaced downwardly, and the shock absorber is extended. The system has been arranged such that the damping coefficient at this time is set to a value that provides "soft" damping force characteristics for the extension stroke and "hard" damping force characteristics for the compression stroke (hereinafter referred to as "extension soft/compression hard characteristics"). Thereafter, on the way to the bottom of the undulation, the shock absorber is compressed by the inertia acting on the vehicle body as the vehicle goes down the undulation. At this time, since the damping coefficient assumes a value for the compression hard characteristics, the upward acceleration rapidly increases. Consequently, the occupant may feel uncomfortable, having a sensation of being strongly pressed against the seat.

To solve the above-described problems, the present applicant proposed a suspension control system as disclosed in JP(A) 7-304315 (U.S. Ser. No. 405,873). The suspension control system has a variable-damping coefficient shock absorber interposed between a sprung member and unsprung member of a vehicle; an actuator for adjusting the damping coefficient of the variable-damping coefficient shock absorber; a damping force control device that sends a control signal to the actuator to adjust the damping coefficient according to the running condition of the vehicle; a vertical acceleration detecting device for detecting a vertical acceleration acting on the vehicle body; and a control signal adjusting device that adjusts the control signal sent to the actuator such that the damping coefficient of the shock absorber is reduced when the vertical acceleration exceeds a preset vertical acceleration reference value. With this arrangement, when the vertical acceleration exceeds the reference value on such an occasion that the vehicle has reached the top or bottom of an undulation of the road surface, the control signal sent to the actuator is adjusted such that the damping coefficient of the shock absorber is reduced, thereby preventing the vertical acceleration from being undesirably enhanced by the damping force generated by the shock absorber, and thus preventing the occupant from feeling a sensation of being thrown out upwardly or strongly pressed against the seat and enabling the occupant to enjoy a comfortable ride.

However, the above-described conventional suspension control system (JP(A)7-304315) suffers from the following problem: In the prior art, a signal representative, for example, of a vertical acceleration acting on a sprung member at a position corresponding to a variable-damping coefficient shock absorber provided for each wheel is detected, and the damping coefficient of each shock absorber is controlled on the basis of the detected vertical acceleration signal. Accordingly, control is effected for each wheel after a vertical acceleration or the like has occurred on the sprung member. Therefore, satisfactory control effect cannot be obtained. Especially, at the rear end of the vehicle, where shock absorbers are likely to be disposed near the occupant, he or she may feel a sensation of being thrown out upwardly or strongly pressed against the seat when the vehicle has reached the top or bottom of an undulation.

BRIEF SUMMARY OF THE INVENTION

In view of the above-described circumstances, an object of the present invention is to provide a suspension control system capable of reliably preventing the occupant of the vehicle from feeling a sensation of being thrown out upwardly or strongly pressed against the seat when the vehicle has reached the top or bottom of an undulation of the road surface, particularly at the rear end of the vehicle, where shock absorbers are likely to be disposed near the occupant.

To solve the above-described object, the present invention provides a suspension control system having a front and rear variable-damping force shock absorbers interposed between a sprung member and respective unsprung members at the front and rear ends of a vehicle. Actuators adjust the damping forces of the front and rear variable-damping force shock absorbers, respectively. A front and rear vertical acceleration detecting devices respectively detect vertical accelerations at the front and rear ends of the sprung member. A damping force control device sends a control signal to the actuators to adjust the damping forces according to the vertical accelerations detected by the front and rear vertical acceleration detecting devices. The damping force control device has a control signal adjusting device that adjusts the control signal such that the damping force of the rear variable-damping force shock absorber is reduced when the vertical acceleration detected by the front vertical acceleration detecting device exceeds a preset vertical acceleration reference value.

By virtue of the above arrangement, when the vertical acceleration detected by the front vertical acceleration detecting device exceeds a preset vertical acceleration reference value, the damping force of the rear variable-damping force shock absorber can be reduced on the basis of the detected vertical acceleration.

In the above-described arrangement, the control signal adjusting device may be arranged to send a control signal to the actuator for the rear variable-damping force shock absorber so that a state where the damping force of the rear variable-damping force shock absorber is reduced is continued for a predetermined period of time when the vertical acceleration detected by the front vertical acceleration detecting device exceeds a preset vertical acceleration reference value.

By virtue of the above arrangement, a state where the damping force of the rear variable-damping force shock absorber is reduced can be continued for a predetermined period of time when the vertical acceleration detected by the front vertical acceleration detecting device exceeds a preset vertical acceleration reference value.

In the above-described arrangement, a vehicle speed detecting device for detecting the speed of the vehicle may be further provided. In this case, when the vertical acceleration detected by the front vertical acceleration detecting device exceeds a preset vertical acceleration reference value, the control signal adjusting device computes timing at which the vertical acceleration at the rear end of the sprung member increases on the basis of the vehicle speed detected by the vehicle speed detecting device, and sends a control signal to the actuator for the rear variable-damping force shock absorber so that the damping force of the rear variable-damping force shock absorber is reduced at that timing.

By virtue of the above arrangement, when the vertical acceleration detected by the front vertical acceleration detecting device exceeds a preset vertical acceleration reference value, timing at which the vertical acceleration at the rear end of the sprung member increases is computed on the basis of the vehicle speed detected by the vehicle speed detecting device. Thus, the damping force of the rear variable-damping force shock absorber can be reduced at that timing.

In addition, the present invention provides a suspension control system having a front and rear variable-damping force shock absorbers interposed between a sprung member and respective unsprung members at the front and rear ends of a vehicle. Actuators adjust the damping forces of the front and rear variable-damping force shock absorbers, respectively. A front and rear vertical acceleration detecting devices respectively detect vertical accelerations at the front and rear ends of the sprung member. A damping force control device sends a control signal to the actuators to adjust the damping forces according to the vertical accelerations detected by the front and rear vertical acceleration detecting devices. The damping force control device has a vertical acceleration change rate calculating part that obtains a rate of change of vertical acceleration on the basis of the vertical acceleration detected by the front vertical acceleration detecting device. A control signal adjusting device adjusts the control signal such that the damping force of the rear variable-damping force shock absorber is reduced when the rate of change of vertical acceleration calculated by the vertical acceleration change rate calculating part exceeds a preset vertical acceleration change rate reference value.

By virtue of the above arrangement, when the rate of change of vertical acceleration calculated by the vertical acceleration change rate calculating part exceeds a preset vertical acceleration change rate reference value, the damping force of the rear variable-damping force shock absorber can be reduced on the basis of the rate of change of the vertical acceleration.

In the above-described arrangement, the control signal adjusting device may be arranged to send a control signal to the actuator for the rear variable-damping force shock absorber so that a state where the damping force of the rear variable-damping force shock absorber is reduced is continued for a predetermined period of time when the rate of change of vertical acceleration calculated by the vertical acceleration change rate calculating part exceeds a preset vertical acceleration change rate reference value.

By virtue of the above arrangement, when the rate of change of vertical acceleration calculated by the vertical acceleration change rate calculating part exceeds a preset vertical acceleration change rate reference value, a state where the damping force of the rear variable-damping force shock absorber is reduced can be continued for a predetermined period of time.

In the above-described arrangement, a vehicle speed detecting device for detecting the speed of the vehicle may be further provided. In this case, when the vertical acceleration change rate calculated by the vertical acceleration change rate calculating part exceeds a preset vertical acceleration change rate reference value, the control signal adjusting device computes timing at which the rate of change of vertical acceleration at the rear end of the sprung member increases on the basis of the vehicle speed detected by the vehicle speed detecting device, and sends a control signal to the actuator for the rear variable-damping force shock absorber so that the damping force of the rear variable-damping force shock absorber is reduced at that timing.

By virtue of the above arrangement, when the vertical acceleration change rate calculated by the vertical acceleration change rate calculating part exceeds a preset vertical acceleration change rate reference value, timing at which the rate of change of vertical acceleration at the rear end of the sprung member increases is computed on the basis of the vehicle speed detected by the vehicle speed detecting device. Thus, the damping force of the rear variable-damping force shock absorber can be reduced at that timing.

BRIEF DESCRIPTION OF THE SEVERAL VIEWS OF THE DRAWING

FIG. 3 is a characteristic chart showing the relationship between the stroke s of a pilot valve in the variable-damping coefficient shock absorber in FIG. 2A and the damping coefficient (damping force).

DETAILED DESCRIPTION OF THE INVENTION

A first embodiment of the present invention will be described below in detail with reference to FIGS. 1 to 7.

Figure 1:
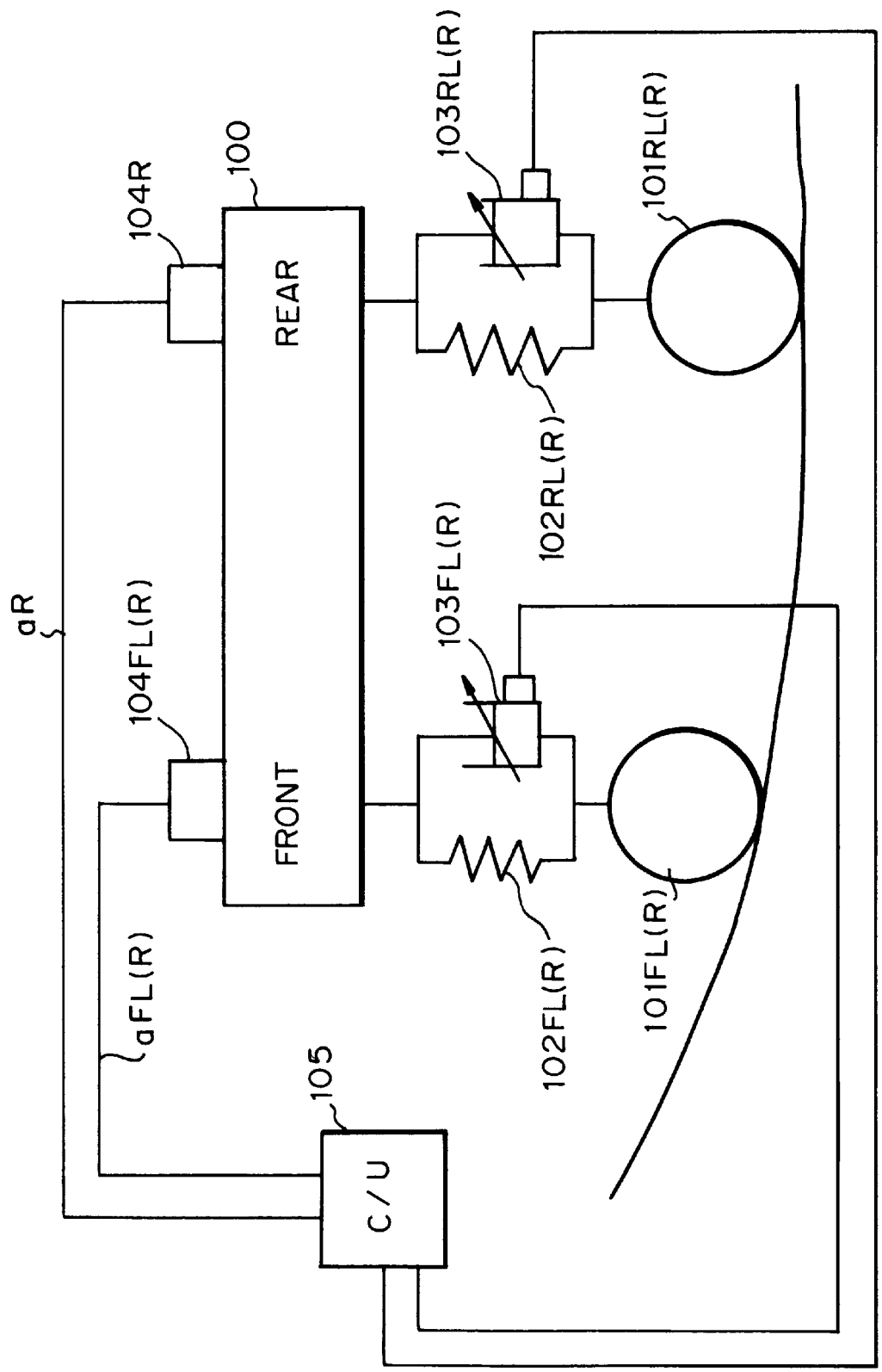
FIG. 1 is a schematic diagram showing the configuration of an automobile to which each embodiment of the present invention is applied.

Referring to FIG. 1, a vehicle has a vehicle body 100 (sprung member) and front and rear left and right wheels 101FL(R) and 101RL(R) (unsprung members). Springs 102FL(R) and 102RL(R) and variable-damping coefficient shock absorbers 103FL(R) and 103RL(R) of the extension/compression inversion type (in which when the damping force characteristics for the extension stroke are "soft", the damping force characteristics for the compression stroke are "hard", and vice versa) are interposed between the vehicle body 100 and the front and rear left and right wheels 101FL(R) and 101RL(R) such that each spring and a shock absorber associated therewith are provided in parallel between the vehicle body 100 and one of the front and rear left and right wheels 101FL(R) and 101RL(R), thereby supporting the vehicle body 100. The vehicle body 100 is equipped with acceleration sensors (front and rear vertical acceleration detecting devices) 104FL(R) and 104R (there is only one acceleration sensor at the rear end) for detecting sprung accelerations αFL(R) and αR (vertical accelerations) at the front left and right sides and the rear end of the vehicle body 100. Acceleration signals from the acceleration sensors 104FL(R) and 104R are supplied to a controller 105. It should be noted that FIG. 1 shows only a pair of front and rear wheels (two left wheels) for the sake of description.

Figure 2A:
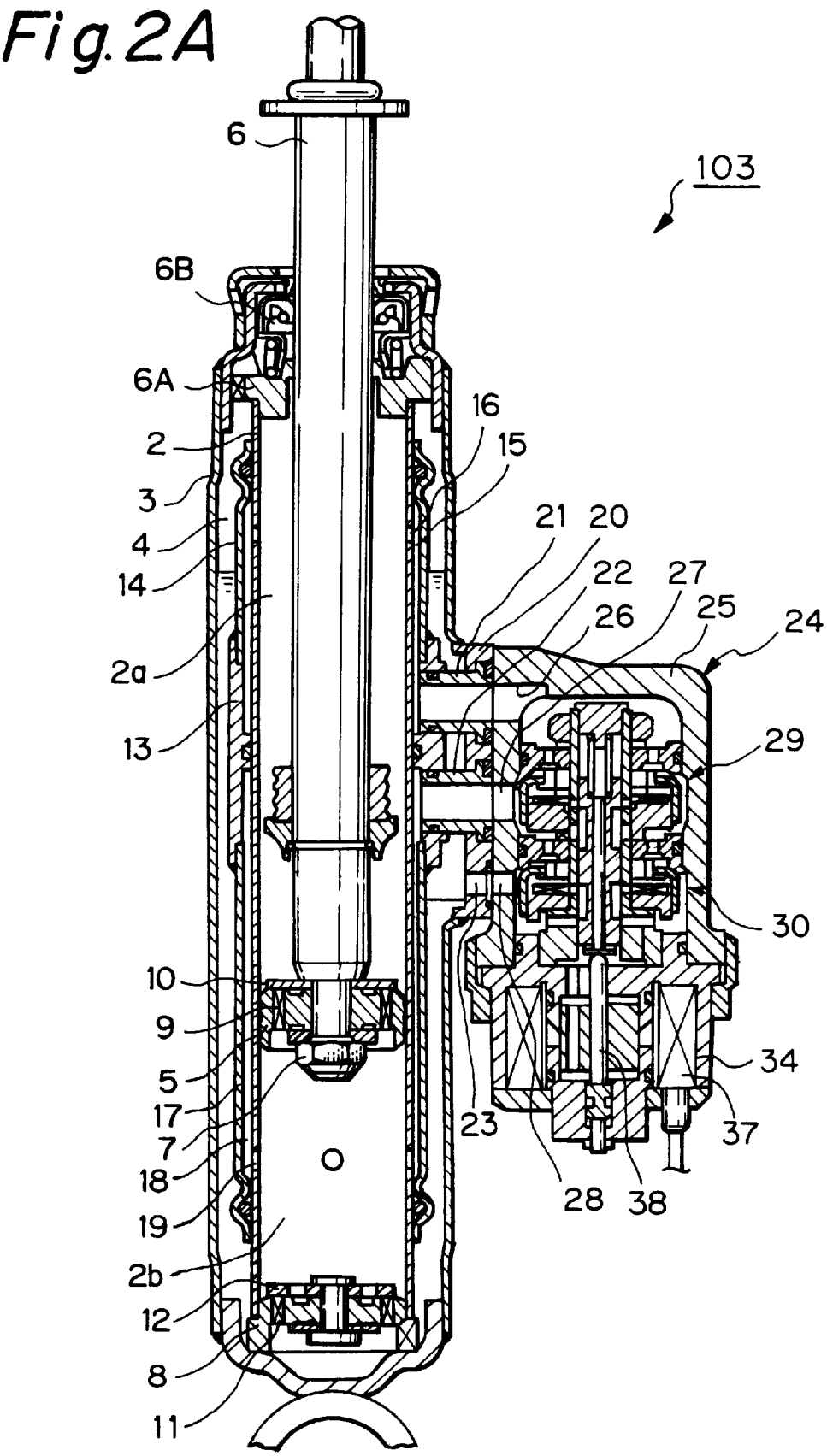
FIG. 2A is a vertical sectional view showing the structure of a variable-damping coefficient shock absorber in FIG. 1.
Figure 2B:
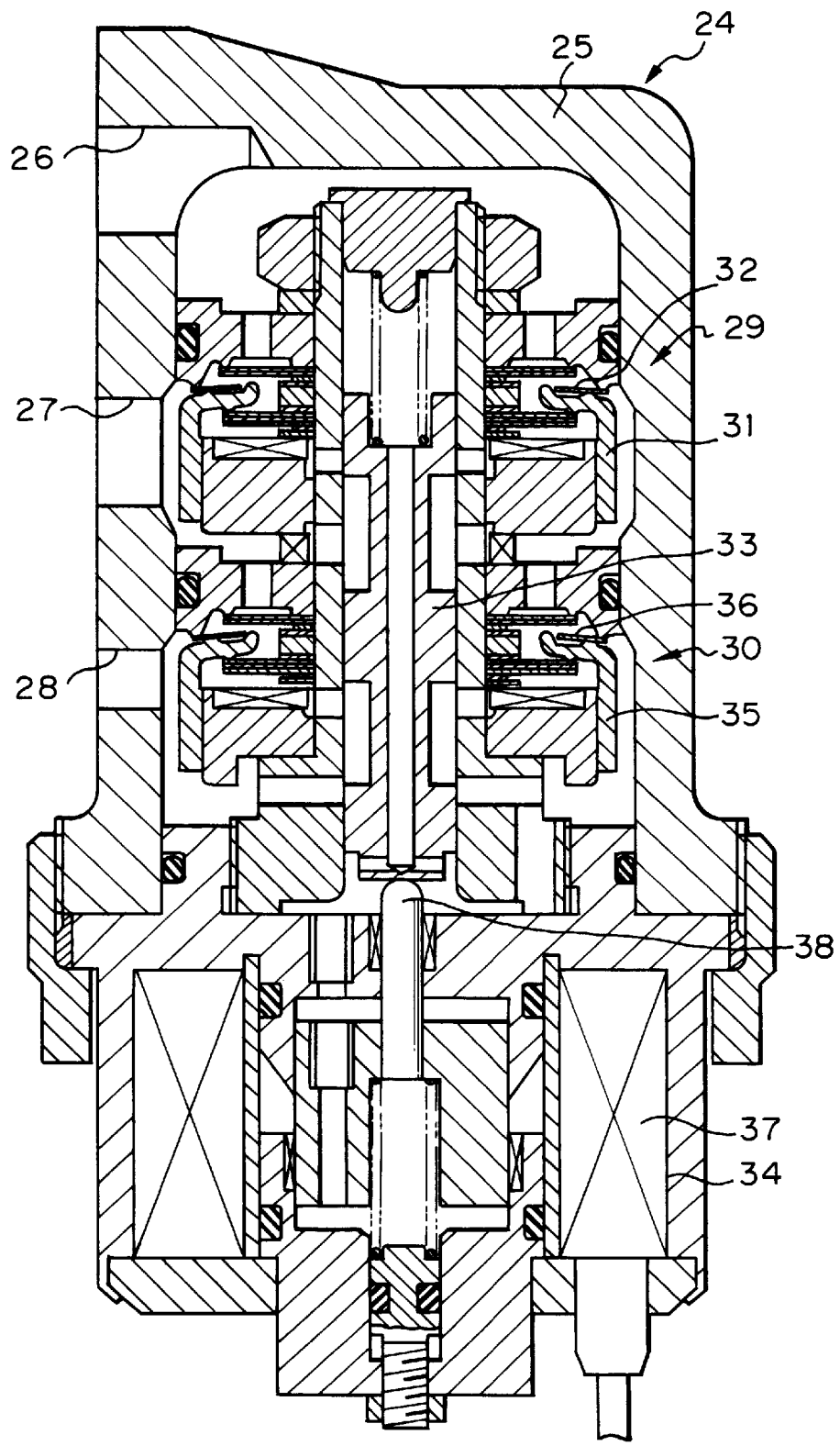
FIG. 2B is a sectional view showing the details of a damping force generating mechanism in FIG. 2A.

FIGS. 2A and 2B show the arrangement of the variable-damping coefficient shock absorbers 103FL(R) and 103RL (R) (in these figures, only one of them is shown by using reference numeral 103 because the shock absorbers 103FL (R) and 103RL(R) have the same arrangement). The variable-damping coefficient shock absorber 103 has a double-cylinder structure having a cylinder 2 and an outer cylinder 3. A reservoir 4 is formed between the cylinder 2 and the outer cylinder 3. A piston 5 is slidably fitted in the cylinder 2. The piston 5 divides the inside of the cylinder 2 into two cylinder chambers, i.e. a cylinder upper chamber 2a and a cylinder lower chamber 2b. One end of a piston rod 6 is connected to the piston 5 by a nut 7. The other end portion of the piston rod 6 extends through the cylinder upper chamber 2a and projects to the outside of the cylinder 2 through a rod guide 6A and a seal member 6B, which are provided in the upper end portion of the double-cylinder structure comprising the cylinder 2 and the outer cylinder 3. A base valve 8 is provided in the lower end portion of the cylinder 2 to divide the cylinder lower chamber 2b and the reservoir 4. The cylinder 2 has a hydraulic fluid sealed therein. The reservoir 4 has both the hydraulic fluid and a gas sealed therein.

The piston 5 is provided with a hydraulic fluid passage 9 for communication between the cylinder upper and lower chambers 2a and 2b and a check valve 10 that allows the flow of hydraulic fluid from the cylinder lower chamber 2b to the cylinder upper chamber 2a through the hydraulic fluid passage 9. The base valve 8 is provided with a hydraulic fluid passage 11 for communication between the cylinder lower chamber 2b and the reservoir 4 and a check valve 12 that allows the flow of hydraulic fluid from the reservoir 4 to the cylinder lower chamber 2b through the hydraulic fluid passage 11.

An approximately cylindrical passage member 13 is fitted on the outer periphery of a central portion of the cylinder 2. An upper tube 14 is fitted on the outer periphery of an upper portion of the cylinder 2 and connected to the passage member 13. The upper tube 14 forms an annular hydraulic fluid passage 15 between it and the cylinder 2. The annular hydraulic fluid passage 15 is communicated with the cylinder upper chamber 2a through a hydraulic fluid passage 16 provided in the side wall of the cylinder 2 near the upper end thereof. A lower tube 17 is fitted on the outer periphery of a lower portion of the cylinder 2 and connected to the passage member 13. The lower tube 17 forms an annular hydraulic fluid passage 18 between it and the cylinder 2. The annular hydraulic fluid passage 18 is communicated with the cylinder lower chamber 2b through a hydraulic fluid passage 19 provided in the side wall of the cylinder 2 near the lower end thereof. A connecting plate 20 is secured to the outer cylinder 3 so as to face the passage member 13. Both the connecting plate 20 and the passage member 13 are pierced with connecting tubes 21 and 22. The connecting tubes 21 and 22 are communicated with the annular hydraulic fluid passages 15 and 18, respectively. The connecting plate 20 is provided with a connecting bore 23, which is communicated with the reservoir 4. A damping force generating mechanism 24 is mounted on the connecting plate 20.

The damping force generating mechanism 24 has a casing 25. The casing 25 is provided with hydraulic fluid passages 26, 27 and 28, which are communicated with the connecting tubes 21 and 22 and the connecting bore 23, respectively. The casing 25 is provided therein with an extension-side damping valve 29 that generates damping force by controlling the flow of hydraulic fluid between the hydraulic fluid passages 26 and 27. The casing 25 is further provided therein with a compression-side damping valve 30 that generates damping force by controlling the flow of hydraulic fluid between the hydraulic fluid passages 27 and 28. Thus, a hydraulic fluid passage (extension-side hydraulic fluid passage) for communication between the cylinder upper and lower chambers 2a and 2b is formed by the hydraulic fluid passage 16, the annular hydraulic fluid passage 15, the connecting tube 21, the hydraulic fluid passage 26, the hydraulic fluid passage 27, the connecting tube 22, the annular hydraulic fluid passage 18 and the hydraulic fluid passage 19. Further, a hydraulic fluid passage (compression-side hydraulic fluid passage for communication between the cylinder lower chamber 2b and the reservoir 4 is formed by the hydraulic fluid passage 19, the annular hydraulic fluid passage 18, the connecting tube 22, the hydraulic fluid passage 27, the hydraulic fluid passage 28 and the connecting bore 23.

The extension-side damping valve 29 comprises a main valve 31 as a pilot-operated pressure control valve, a sub-valve 32 as a pressure control valve, and a pilot valve 33 (spool valve) as a variable-flow control valve. The pilot valve 33 is actuated by a proportional solenoid-operated actuator 34 (hereinafter referred to as "actuator 34") to change the passage area between the hydraulic fluid passages 26 and 27, thereby adjusting the orifice characteristics (in which the damping force is approximately proportional to the square of the piston speed). In addition, the valve-opening pressure of the main valve 31 is changed by varying the pilot pressure, thereby enabling adjustment of the valve characteristics (in which the damping force is approximately proportional to the piston speed). It should be noted that, the sub-valve 32 serves the function of generating an appropriate damping force (valve characteristics) in the low piston speed region, i.e. in the orifice characteristic region.

The compression-side or contraction-side damping valve 30 comprises a main valve 35 as a pilot-operated pressure control valve, a sub-valve 36 as a pressure control valve, and the pilot valve 33, which is common to the extension- and contraction-side damping valves 29 and 30. As in the case of the extension-side damping valve 29, the pilot valve 33 is actuated by the actuator 34 to change the passage area between the hydraulic fluid passages 27 and 28, thereby adjusting the orifice characteristics, and the valve-opening pressure of the main valve 35 is changed by varying the pilot pressure, thereby enabling adjustment of the valve characteristics. It should be noted that the sub-valve 36 serves the function of generating an appropriate damping force (valve characteristics) in the low piston speed region, i.e. in the orifice characteristic region.

If the pilot valve 33, which is common to the extension- and contraction-side damping valves 29 and 30, is controlled by the actuator 34 such that the pilot pressure acting on the main valve 31 of the extension-side damping valve 29 increases, the pilot pressure acting on the main valve 35 of the contraction-side damping valve 30 reduces. Conversely, if the pilot valve 33 is controlled by the actuator 34 such that the pilot pressure acting on the main valve 31 of the extension-side damping valve 29 reduces, the pilot pressure acting on the main valve 35 of the contraction-side damping valve 30 increases. In other words, if the pilot pressure acting on the main valve 31 is increased, the extension-side damping force increases, while the pilot pressure acting on the main valve 35 reduces, and consequently, the contraction-side damping force decreases. Conversely, if the pilot pressure acting on the main valve 31 is reduced, the extension-side damping force decreases, while the pilot pressure acting on the main valve 35 increases, and consequently, the contraction-side damping force increases.

In FIG. 2B, a coil 37 drives a movable pin 38 according to the magnitude of energizing current supplied from the controller 105. The coil 37 drives the movable pin 38 to move by an amount proportional to the magnitude of the energizing current. The movement of the movable pin 38 causes the pilot valve 33 to move. Thus, when the energizing current is small (the stroke of the pilot valve 33 is small), the extension-side damping force is set small, whereas the contraction-side damping force is set large. When the energizing current is large (the stroke of the pilot valve 33 is large), the extension-side damping force is set large, whereas the contraction-side damping force is set small. The actuator 34 actuates the movable pin 38 on the basis of a control signal I (energizing current) sent from a damping coefficient control section of the controller 105 (described later). The damping coefficient (damping force) characteristics of the variable-damping coefficient shock absorber 103 are shown in FIG. 3. FIG. 3 shows the size of the damping coefficient (damping force) for each of the extension and compression (contraction) sides with respect to the stroke s of the pilot valve 33.

Figure 4:
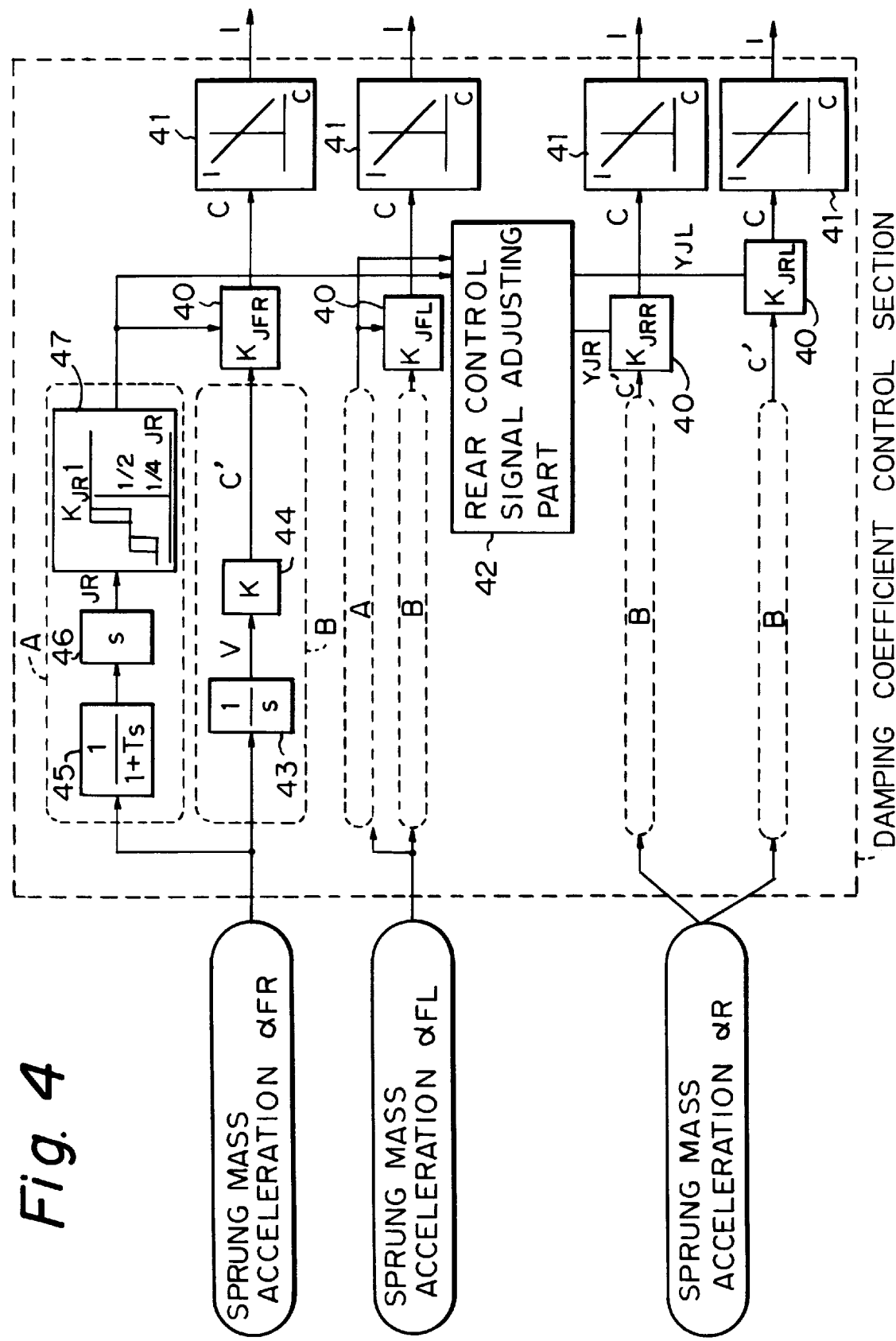
FIG. 4 is a block diagram showing a control system according to a first embodiment of the present invention.

The controller 105 has a damping coefficient control section (damping coefficient control device) as shown in FIG. 4. The damping coefficient control section roughly comprises an absolute velocity calculating part B provided for each wheel; a sprung acceleration change rate calculating part A (hereinafter referred to as "jerk calculating part") for each of the two front wheels; a control gain deciding part 40 for each wheel; a damping coefficient-current converting part 41 for each wheel; and a rear variable-damping coefficient shock absorber control signal adjusting part 42 (hereinafter referred to as "rear control signal adjusting part"). A control signal adjusting device is formed from the control gain deciding part 40 provided for each of the two rear wheels and the rear control signal adjusting part 42.

Each absolute velocity calculating part B includes a computing unit 43 (only one that is provided for the front right wheel is shown for the sake of convenience) that obtains a sprung absolute velocity V (vehicle running condition) by integrating each of the sprung accelerations $\alpha FL(R)$ and $\alpha R$ at the front left and right sides and the rear end. The absolute velocity calculating part B further includes an amplifier 44 that amplifies the input absolute velocity V by multiplying it by a gain K of predetermined size to obtain an uncorrected control command signal C' and outputs the uncorrected control command signal C' to the control gain deciding part 40.

Each jerk calculating part A includes a low-pass filter 45 (only one that is provided for the front right wheel is shown for the sake of convenience) for removing a high-frequency signal from the sprung acceleration $\alpha FL(R)$ (at the front end), and a computing unit 46 that calculates a jerk (rate of change of acceleration) JR(L) by differentiating the sprung acceleration $\alpha FL(R)$ processed through the low-pass filter 45. The jerk calculating part A further includes a correction gain selecting unit 47 that selects a jerk correction gain KJR(L) on the basis of the calculated jerk JR(L) and outputs the jerk correction gain KJR(L) to the control gain deciding part 40 (for the front end) and also to the rear control signal adjusting part 42.

In each control gain deciding part 40 (for the front end), the uncorrected control command signal C' outputted from the absolute velocity calculating part B (for the front side) is multiplied by the jerk correction gain KJR(L) outputted from the jerk calculating part A, thereby outputting a coefficient KJFR(L) as a corrected control command signal C (for the front end). The corrected control command signal C thus obtained is outputted to the damping coefficient-current converting part 41 (for the front end), where a control signal I (for the front end) for controlling the actuator 34 (for the front end) is determined on the basis of the corrected control command signal C.

The adjustment of the damping coefficient of the rear variable-damping coefficient shock absorber 103RL(R) will be described below. The sprung acceleration $\alpha R$ (at the rear end) is inputted to the absolute velocity calculating part B (for the rear end) and converted into an uncorrected control command signal C' (for the rear end) by the above-described arithmetic processing. The uncorrected control command signal C' is outputted to the control gain deciding part 40 (for the rear end). The control system of the rear variable-damping coefficient shock absorber 103RL(R) has no jerk calculating part A such as those provided for the front end. For the rear variable-damping coefficient shock absorber 103RL(R), the jerk correction gain KJR(L) obtained from the sprung acceleration αFL(R) (at the front end) is outputted to the rear control signal adjusting part 42, where a predetermined value (jerk correction value YJR(L) for adjusting the uncorrected control command signal C' (for the rear end) is calculated. In the control gain deciding part 40 (for the rear end), the uncorrected control command signal C' (for the rear end) is multiplied by the jerk correction value YJR(L) to obtain a coefficient KJRR(L) as a corrected control command signal C (for the rear end), which is outputted to the damping coefficient-current converting part 41 (for the rear end). In the damping coefficient-current converting part 41, a control signal I for controlling the actuator 34 (for the rear end) is determined on the basis of the corrected control command signal C. In other words, the damping coefficient of each rear variable-damping coefficient shock absorber is adjusted on the basis of the sprung acceleration αFL(R).

Figure 5:
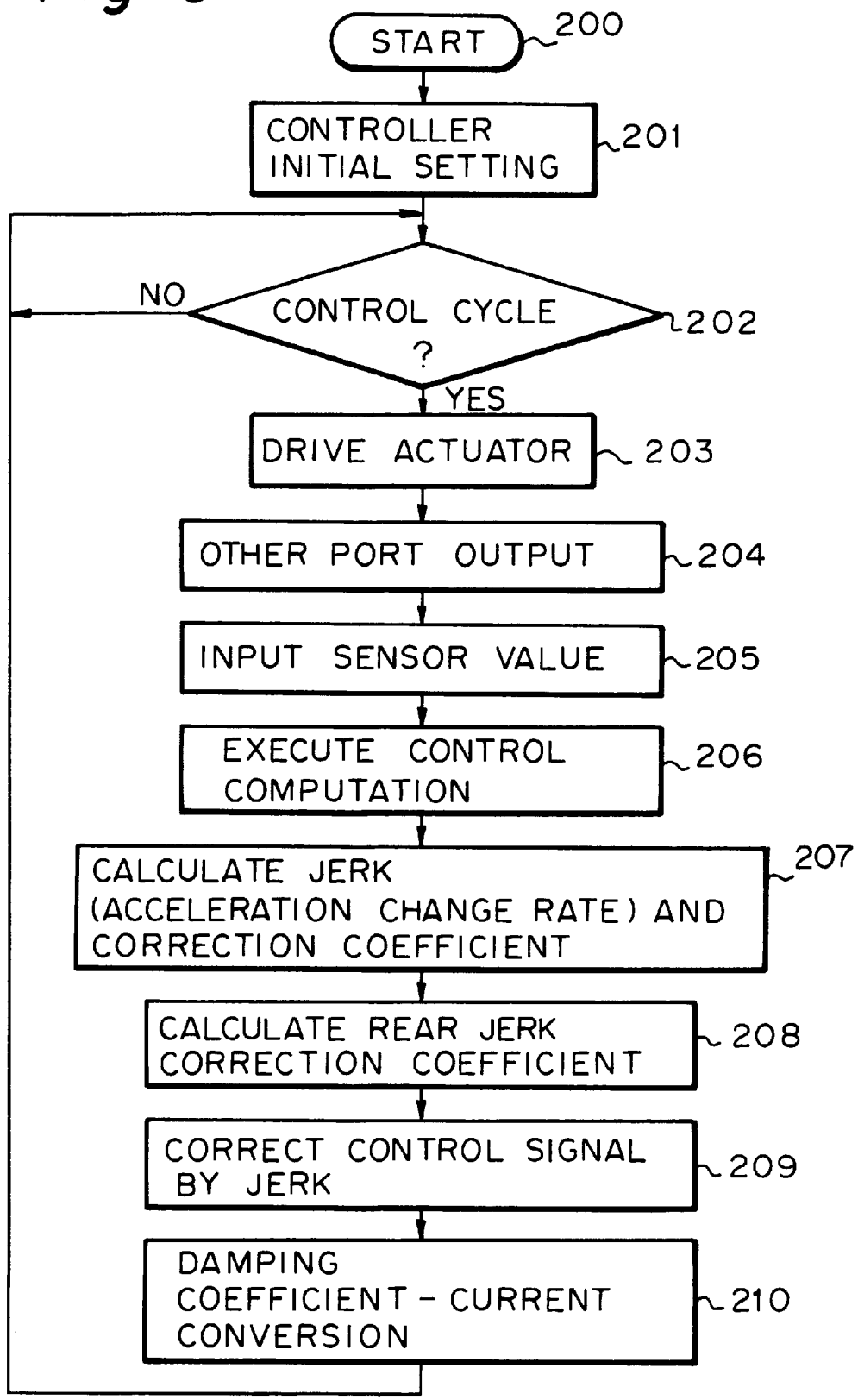
FIG. 5 is a main flowchart showing a control procedure performed by the control system shown in FIG. 4.

Next, the main flowchart will be described with reference to FIG. 5. When the power supply for the controller 105 is turned on in response to the starting of the engine of the vehicle, for example, the execution of the control software is started (step 200). Subsequently, the controller initial setting is executed (step 201). Then, it is judged whether or not a predetermined control cycle has been reached (step 202). At step 202, the judgment as to whether or not the control cycle has been reached is repeated until it is judged that the control cycle has been reached.

If it is judged at step 202 that the control cycle has been reached (if YES), each actuator 34 is driven (step 203). Subsequently, mechanisms (e.g. LEDs) other than the actuator 34 are controlled by outputting signals thereto at step 204. Next, sprung accelerations αFL(R) and αR are read from the acceleration sensors 104FL(R) and 104R (step 205). Subsequently, control computations are executed in the absolute velocity calculating parts B on the basis of the sprung accelerations αFL(R) and αR (step 206). Next, each jerk calculating part A calculates a jerk (acceleration change rate) and correction coefficient (jerk correction gain KJR(L)) on the basis of the sprung acceleration αFL(R) (at the front end) (step 207). Subsequently, the rear control signal adjusting part 42 calculates a rear jerk correction coefficient (jerk correction value YJR(L)) on the basis of the jerk correction gain KJR(L) (step 208). Next, the control gain deciding parts 40 respectively corresponding to the front and rear left and right wheels perform correction of the control signals (uncorrected control command signals C') on the basis of the jerks (jerk correction gains KJR(L)) (step 209). Then, the damping coefficient-current converting parts 41 respectively corresponding to the wheels decide control signals I for controlling the actuators 34 on the basis of the corrected control command signals C (coefficients KJFR(L) and KJRR(L)) (step 210). On the basis of the control signals I obtained at step 210, the actuators 34 are driven at step 203 in the next control cycle to obtain desired damping coefficients.

Figure 6:
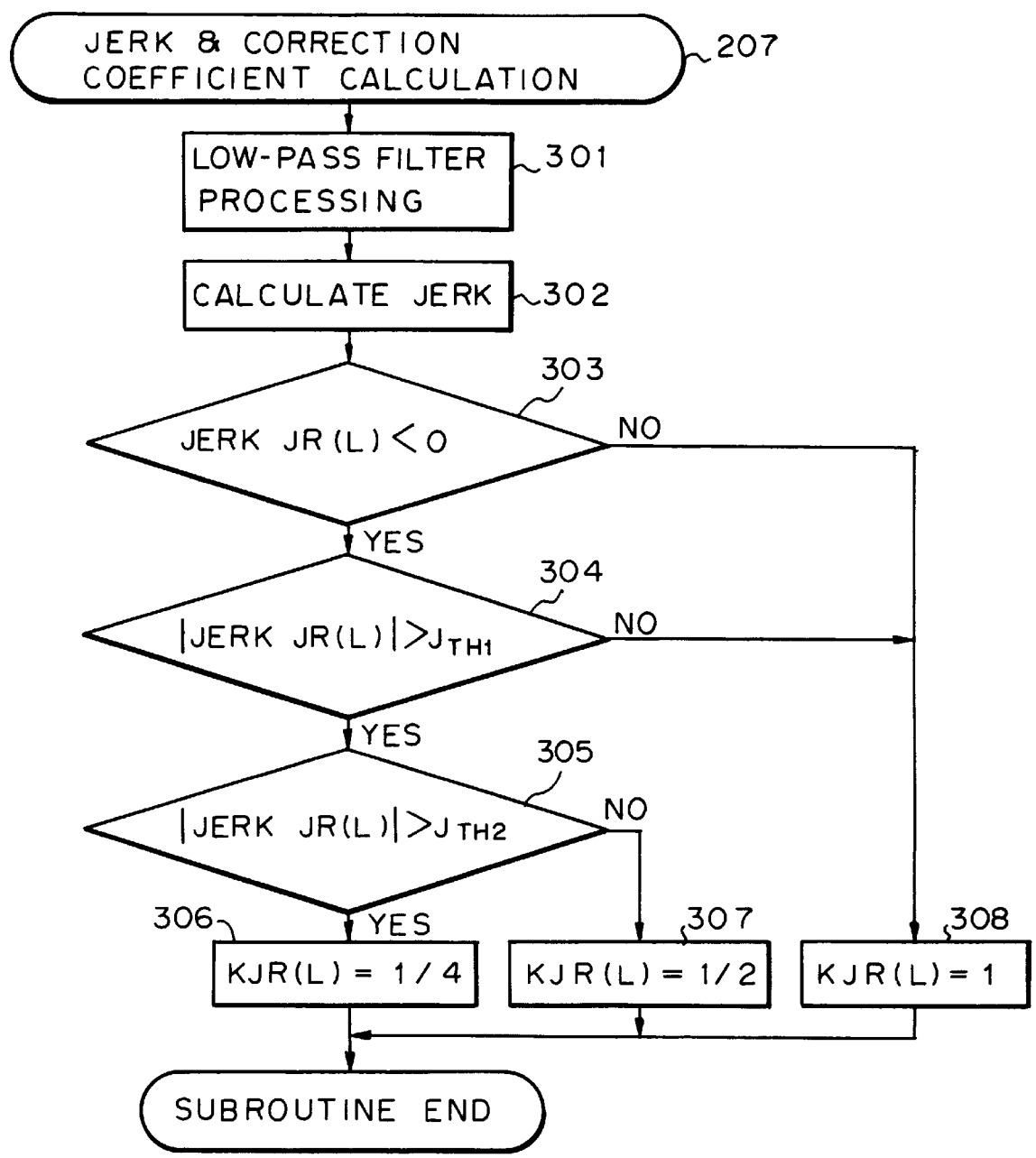
FIG. 6 is a flowchart showing the details of jerk correction coefficient calculation executed by the control system shown in FIG. 4.

Next, the jerk and correction coefficient calculation executed by the jerk calculating part A at step 207 will be described in detail with reference to FIG. 6.

First, low-pass filter processing for cutting off a high-frequency noise component from the sprung acceleration (signal) αFL(R) (at the front end) is executed on the basis of this signal (step 301). Subsequently, the sprung acceleration αFL(R) subjected to the low-pass filter processing is differentiated to obtain a jerk JR(L) (step 302). In the first embodiment, correction is made for the downward jerk JR(L) (the rate of change of the downward acceleration acting on the vehicle body when the vehicle has reached the top of an undulation) to prevent the occupant from feeling as if he or she were thrown out upwardly. Therefore, it is judged whether or not the jerk JR(L) is smaller than zero (step 303). If the result of the judgment is NO, the jerk correction gain KJR(L) is set equal to 1, and this is outputted to the control gain deciding part 40 so that the controlled variable i s equ al to the value assumed during the normal running (in which the uncorrected control command signal C' obtained in the absolute velocity calculating part B is not corrected; the corrected control command signal C is set equal to the uncorrected control command signal C') (step 308).

If the result of the judgment at step 303 is YES, i.e. if the jerk JR(L) is smaller than zero, the process proceeds to step 304, at which a judgment is made as to whether or not the absolute value of the jerk JR(L) is larger than a first threshold value JTH1 of jerk. If the absolute value of th e jerk JR(L) is not larger than the first threshold value JTH1 (if NO), the process proceeds to step 308, at which the jerk correction gain KJR(L) is set equal to 1, and this is outputted to the control gain deciding part 40 so that the controlled variable is equal to the value assumed during the normal running (the corrected control command signal C is set equal to the uncorrected control command signal C').

If the absolute value of the jerk JR(L) is judged to be larger than the first threshold value JTH1 of jerk at step 304 (if YES), the process proceeds to step 305, at which a judgment is made as to whether or not the absolute value of the jerk JR(L) is larger than a second threshold value JTH2 of jerk, which is larger than the first threshold value JTH1 of jerk (JTH1<JTH2). If the absolute value of the jerk JR(L) is not larger than the second threshold value JTH2 of jerk (if NO), the process proceeds to step 307, at which the jerk correction gain KJR(L) is set equal to ½, and this is outputted to the control gain deciding part 40 so that the controlled variable becomes ½ of the value assumed during the normal running (i.e. C=½·C'). If it is judged at step 305 that the absolute value of the jerk JR(L) is larger than the second threshold value JTH2 of jerk (if YES), the process proceeds to step 306, at which the jerk correction gain KJR(L) is set equal to ¼, and this is outputted to the control gain deciding part 40 so that the controlled variable becomes ¼ of the value assumed during the normal running (i.e. C=¼·C'). The first and second threshold values JTH1 and JTH2 of jerk have previously been stored in the correction gain selecting unit 47. This is schematically shown in the map (selection map) in the correction gain selecting unit 47 in FIG. 4.

The stroke s of the pilot valve 33 of the actuator 34 is in proportional relation to the control signal I (energizing current) outputted to the actuator 34. That is, as the control signal I increases, the stroke s changes to a larger extent. The corrected control command signal C subjected to the above-described judgment is converted into a control signal I in the damping coefficient-current converting part 41. As shown in the conversion map in the damping coefficient-current converting part 41 in FIG. 4, the control signal I is so selected as to gradually increase (the rate of change of the stroke s also gradually increases) as the corrected control command signal C gradually decreases to ½, ¼, . . .

Figure 7:
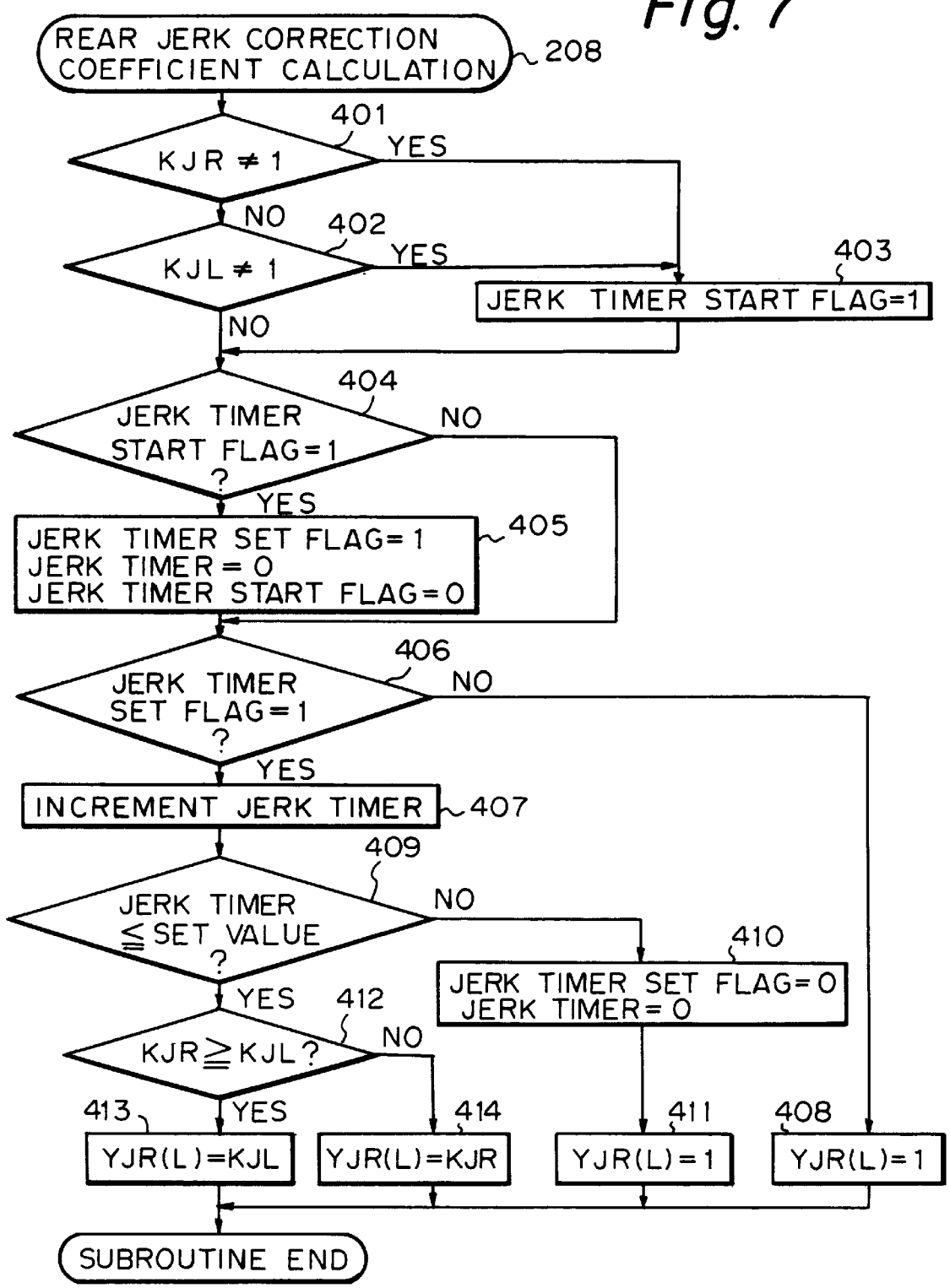
FIG. 7 is a flowchart showing the details of rear jerk correction coefficient calculation executed by the control system shown in FIG. 4.

Next, the rear jerk correction coefficient calculation executed by the control gain deciding part 40 provided for each of the two rear wheels and the rear control signal adjusting part 42 (control signal adjusting device) at step 208 will be described in detail with reference to FIG. 7.

At steps 401 and 402, it is judged whether or not the jerk correction gain KJR(L) (one of the three values: 1, ½ and ¼) obtained by the above-described judgment on the basis of the sprung acceleration αFL(R) (at the front end) is a value other than 1 (KJR(L)=/1, or KJR=/1 and KJL=1, or KJR=1 and KJL=/1). If the result of the judgment is YES (if KJR(L)=½ or KJR(L)=¼), the jerk timer start flag is set (jerk timer start flag=1) (step 403), and then the process proceeds to step 404. If the results of the judgment at steps 401 and 402 are NO (KJR(L)=1), the jerk timer start flag is not set (jerk timer start flag=0), and then the process proceeds to step 404.

At step 404, it is judged whether or not the jerk timer start flag is 1. If the jerk timer start flag is judged to be 1 (if YES), step 405 is executed to prepare for starting the timer. If it is judged at step 404 that the jerk timer start flag is 0 (if NO), the process proceeds to step 406. If it is judged at step 406 that the jerk timer set flag is 1, the jerk timer is incremented (step 407). If the jerk timer set flag is judged to be 0 at step 406, the jerk correction value YJR(L) (a predetermined value for adjusting the uncorrected control command signal C') is set equal to 1, and correction of the controlled variable is not made (step 408). That is, the controlled variable is equal to the value assumed during the normal running, i.e. the uncorrected control command signal C' is equal to the corrected control command signals C.

At step 409, it is judged whether or not the jerk timer has a value equal to or smaller than a set value (time). If the value of the jerk timer is larger than the set value (if NO), the process proceeds to step 410, at which both the jerk timer set flag and the jerk timer are cleared (=0). Then, the jerk correction value YJR(L) is set equal to 1 at step 411. If the value of the jerk timer is equal to or smaller than the set value (if YES) at step 409, a size comparison is made at step 412 between the jerk correction gains KJR and KJL for the front right and left wheels to judge whether or not KJR assumes a value equal to or larger than KJL. If NO is the result of the judgment at step 412 (if KJR<KJL), the jerk correction gain KJR, which is smaller than the other, is decided to be a jerk correction value (YJR(L)=KJR). If YES is the result of the judgment at step 412 (if KJR>_ KJL), the jerk correction gain KJL, which is smaller than the other, is decided to be a jerk correction value (YJR(L)=KJL).

Thus, the rear control signal adjusting part 42 obtains the jerk correction value YJR(L) (for the rear end) from the jerk correction gain KJR(L) obtained on the basis of the sprung acceleration αFL(R) (at the front end), and outputs the jerk correction value YJR(L) to each control gain deciding part 40 (for the rear end). The control gain deciding part 40 multiplies the uncorrected control command signal C' by the jerk correction value YJR(L) (one of the three values: 1, ½ and ¼) to output a coefficient KJRR(L) as a corrected control command signal C (for the rear end). The corrected control command signal C thus obtained is outputted to the damping coefficient-current converting part 41 (for the rear end). The damping coefficient-current converting part 41 decides a control signal I on the basis of the corrected control command signal C.

The operation of the suspension control system arranged as described above will be described below.

When the vehicle begins to go up an undulation of the road surface, for example, the vehicle body 100 is displaced upwardly, and all the variable-damping coefficient shock absorbers 103FL(R) and 103RL(R) are contracted. The system has been arranged such that the damping coefficient at this time is set to a value that provides extension hard/contraction soft characteristics (the control during the normal running is the same as that in the prior art). Thus, the road surface change is unlikely to be transmitted to the vehicle body 100, and a favorable ride quality is obtained. Thereafter, on the way to the top of the undulation, the variable-damping coefficient shock absorbers 103FL(R) and 103RL(R) begin to extend by the resilient force from the springs 102FL(R) and 102RL(R) contracted as the vehicle began to go up the undulation, causing the vehicle body 100 to move upwardly at a relatively high velocity in cooperation with the inertia acting on the vehicle body 100 as the vehicle goes up the undulation.

In general, the front and rear wheels of a vehicle are provided with a predetermined wheelbase (distance between the front and rear wheels). Therefore, the front wheel 101FL(R) first goes up an undulation of the road surface. At this time, if the jerk JR(L) of the vertical acceleration αFL(R) (the downward acceleration acting on the vehicle body 100) detected by the front acceleration sensor 104FL(R) is not in excess of the first threshold value JTH1, the occupant does not feel a sensation of being thrown out upwardly. Therefore, the pilot valve 33 of the actuator 34 is controlled by the same procedure as in the previous control cycle using the controlled variable for the normal running [in which the size of the control signal I is small, and the rate of change of the pilot valve 33 of the actuator 34 is small (i.e. the amount of displacement from the position of the pilot valve 33 by the normal control is small)]. That is, the suspension control system is in the extension hard/contraction soft characteristic conditions.

In a case where the jerk JR(L) exceeds the first threshold value JTH1 and is not in excess of the second threshold value JTH2, there is a slight possibility of the occupant feeling a sensation of being thrown out upwardly. Therefore, the controlled variable is set to ½ (the size of the control signal I is medium, and the rate of change of the pilot valve 33 is also medium) to thereby increase the rate of change of the pilot valve 33 of the actuator 34 (the stroke s of the pilot valve 33 is medium). That is, in the previous control cycle the damping coefficient was set to provide extension hard characteristics, whereas in the present cycle the damping coefficient is set to provide extension soft (medium soft) characteristics, thereby enabling the variable-damping coefficient shock absorbers 103FL(R) and 103RL(R) to extend easily.

In a case where the jerk JR(L) exceeds the second threshold value JTH2, there is a strong possibility of the occupant feeling a sensation of being thrown out upwardly. Therefore, the controlled variable is set to ¼ (the size of the control signal I is large, and the rate of change of the pilot valve 33 is also high), thereby further increasing the rate of change of the pilot valve 33 of the actuator 34 (the stroke s of the pilot valve 33 is large). That is, in the previous control cycle the damping coefficient (damping force) was set to provide extension hard characteristics, whereas in the present control cycle the damping coefficient is set to provide extension softer (very soft) characteristics, thereby enabling the variable-damping coefficient shock absorbers 103FL(R) and 103RL(R) to extend even more easily.

After the front wheel 101FL(R) of the vehicle has passed the top of the undulation of the road surface, the rear wheel 101RL(R) goes up the undulation. At this time, the damping coefficient of the rear variable-damping coefficient shock absorber 103RL(R) has already been held at a value corrected (by the jerk correction value YJR(L)) on the basis of the jerk JR(L) of the vertical acceleration αFL(R) detected by the front acceleration sensor 104FL(R). Therefore, the rear variable-damping coefficient shock absorber 103RL(R) is easy to extend and hence capable of speedily and reliably preventing the occupant from feeling a sensation of being thrown out upwardly. In particular, an advantageous effect is obtained for the occupant located at the rear end of the vehicle body 100 (in the vicinity of the shock absorbers which are subjected to road surface changes).

Although in the first embodiment correction is made with respect to only the downward jerk (the rate of change of acceleration acting downwardly on the vehicle body when the vehicle has reached the top of the undulation) to prevent the occupant from feeling a sensation of being thrown out upwardly, the arrangement may be such that correction is made with respect to the upward jerk (the rate of change of acceleration acting upwardly on the vehicle body when the vehicle has reached the bottom of the undulation). In this case, the occupant can be reliably prevented from feeling a sensation of being strongly pressed against the seat.

Figure 8:
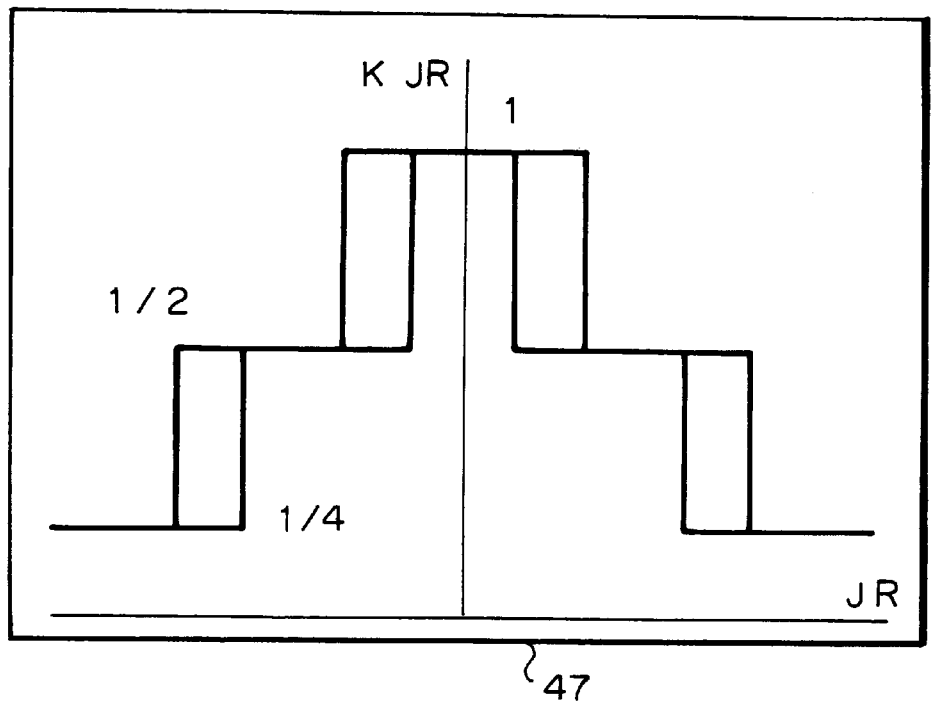
FIG. 8 is a map showing a modification of a correction gain calculating unit in a jerk calculating part A of the control system shown in FIG. 4.
Figure 9:
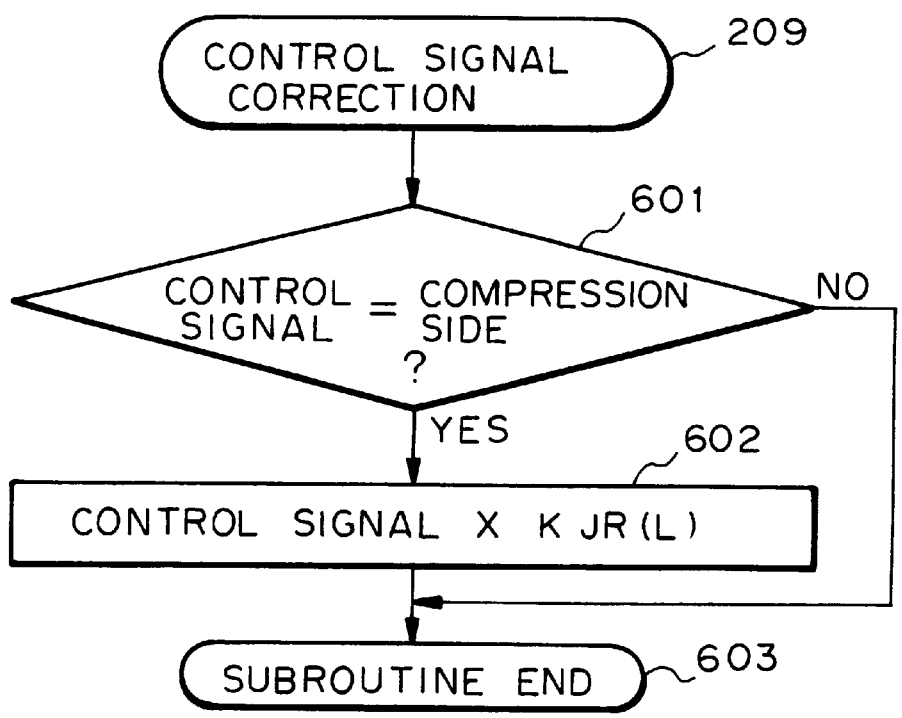
FIG. 9 is a flowchart showing a computing procedure according to the modification shown in FIG. 8.

A modification of the first embodiment will be described below with reference to FIGS. 8 and 9. FIG. 8 shows a correction gain calculating unit in a control block according to the modification. The correction gain calculating unit differs only in the structure of selection map from the correction gain calculating unit 47 in the jerk calculating part A shown in FIG. 4. More specifically, the correction gain calculating unit differs from the correction gain calculating unit 47 in the first embodiment in that the jerk JR(L) has the first and second threshold values also in the positive region of the selection map (the right-hand half of the map). Accordingly, when the jerk JR(L) of the vertical acceleration αFL(R) detected by the front acceleration sensor 104FL(R) is positive (which means that an upward jerk has occurred), the jerk JR(L) is compared with the first and second threshold values in the positive region, and consequently, the damping coefficient control section drives the actuator 34 in a direction reverse to that in the case of the downward jerk (the system is brought into contraction soft/extension hard characteristic conditions), thereby reliably preventing the occupant from feeling a sensation of being strongly pressed against the seat.

The control procedure according to the above-described modification will be described below. Control signal correcting processing (the correction of the extension-side damping coefficient obtained on the basis of the calculation by the jerk calculating part A) is executed at step 209 in FIG. 5. The details of the control at step 209 are shown in FIG. 9. At step 601, it is judged whether or not the present control signal is for the contraction side. If NO is the result of the judgment at step 601 (control signal=extension side), it means that the contraction side has already been brought into soft characteristic conditions. Therefore, no correction is needed, and the process proceeds to step 603, at which the control according to the above-described embodiment is executed. If YES is the result of the judgment at step 601, (control signal=contraction side), the process proceeds to step 602, at which the control signal is multiplied by the jerk correction gain KJR(L) obtained at step 207 in FIG. 5 to correct the control command signal C in order to suppress a jerk (upward) occurring due to the contraction hard characteristics.

By virtue of the above arrangement, the controlled variable for adjusting the damping force can be corrected also with respect to the upward jerk (the rate of change of acceleration acting upwardly on the vehicle body when the vehicle has reached the bottom of the undulation). Accordingly, it is possible to reliably prevent the occupant from feeling a sensation of being strongly pressed against the seat when the vehicle has reached the bottom of the undulation.

Figure 10:
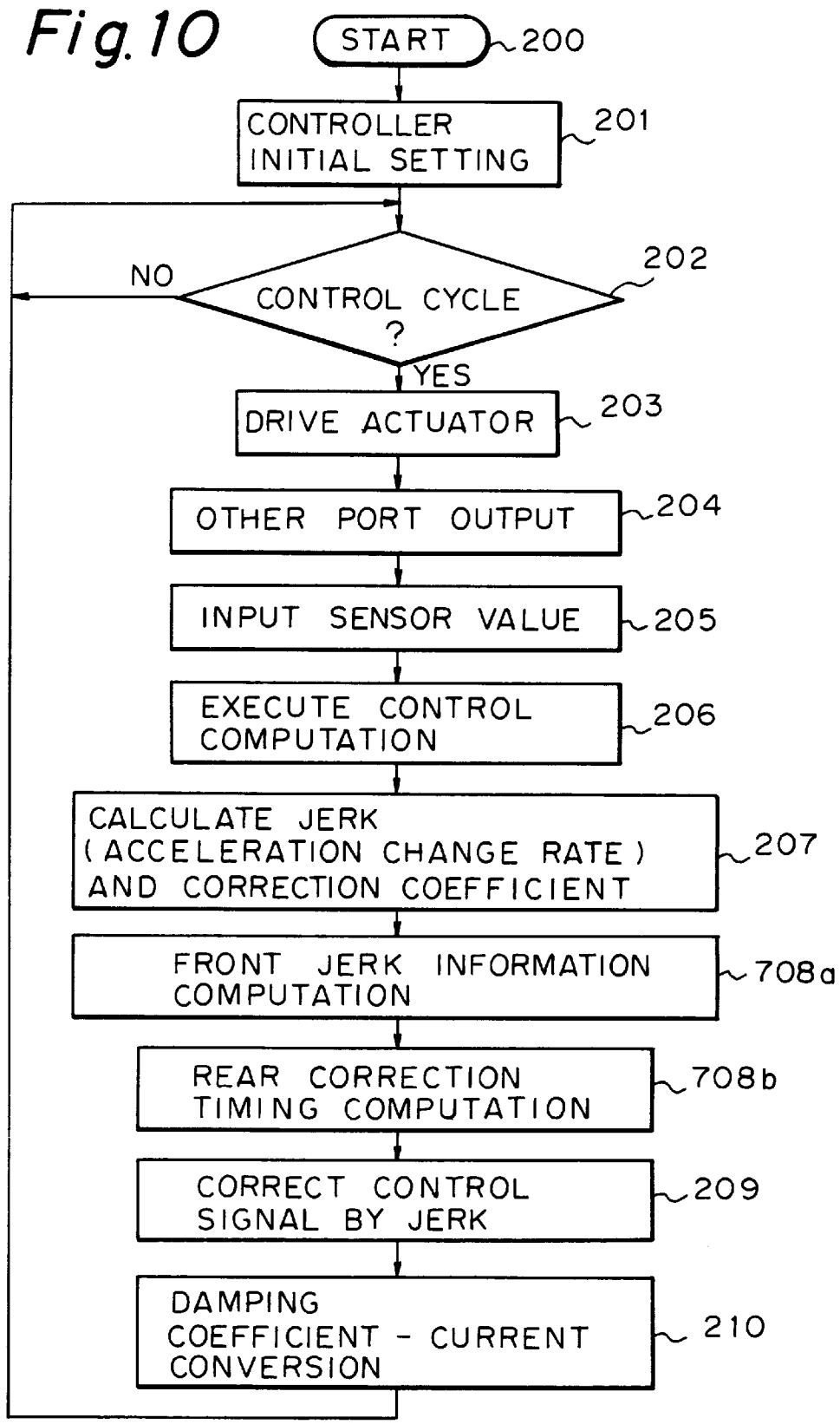
FIG. 10 is a main flowchart showing a control procedure according to a second embodiment of the present invention.
Figure 11:
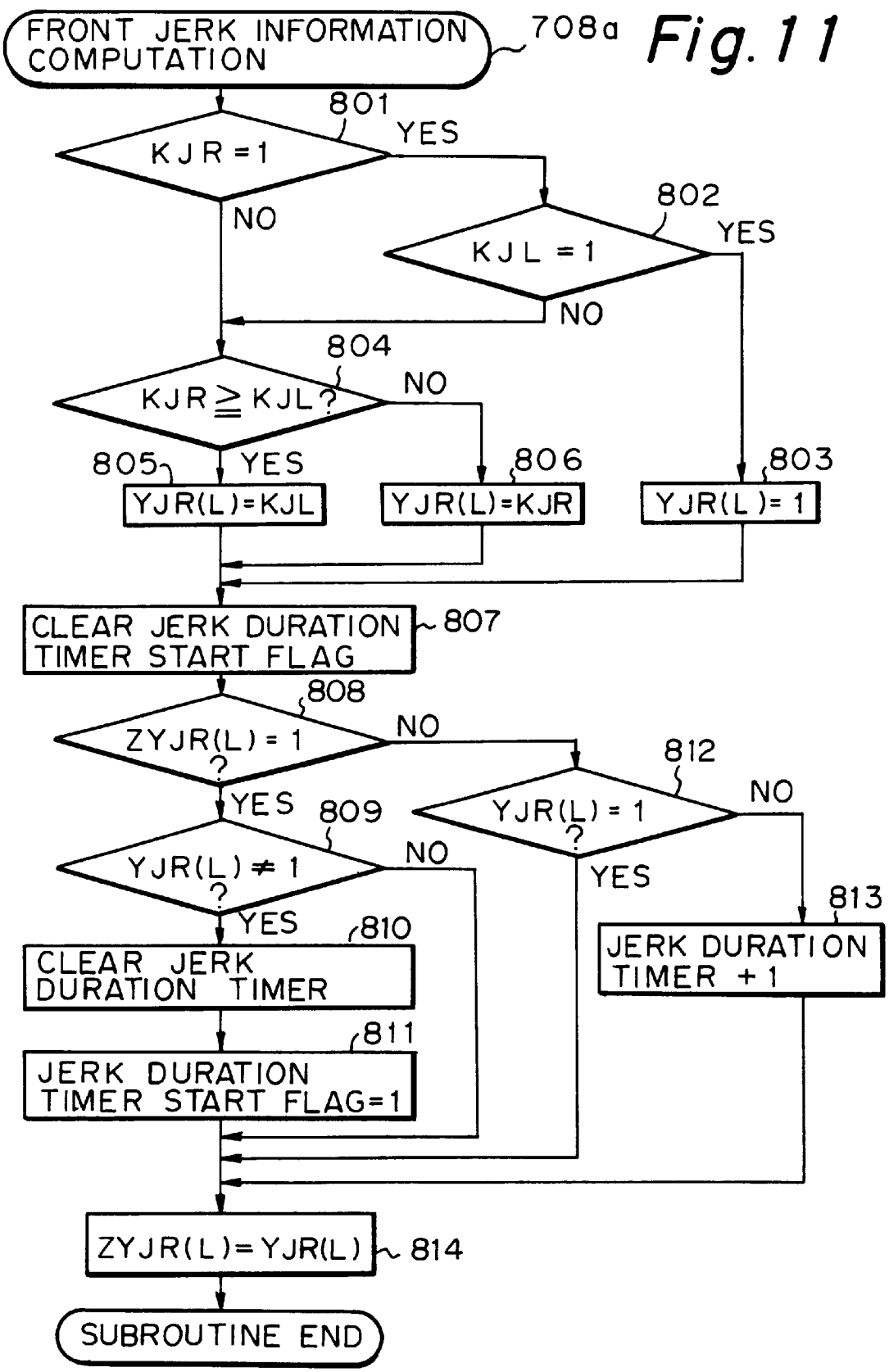
FIG. 11 is a flowchart showing the details of front jerk information computation in FIG. 10.
Figure 12:
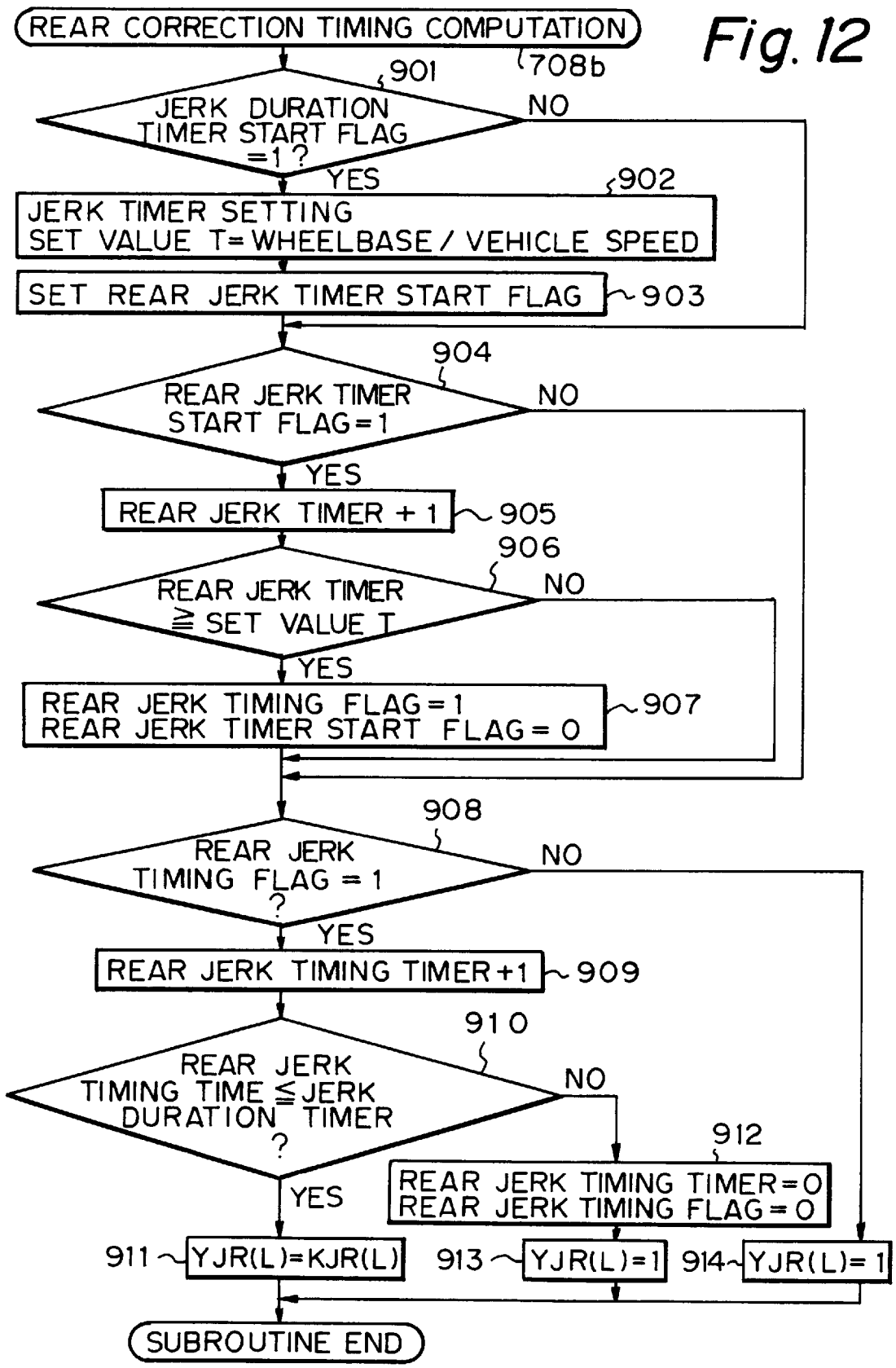
FIG. 12 is a flowchart showing the details of rear correction timing computation in FIG. 10.

Next, a second embodiment of the present invention will be described with reference to FIGS. 10 to 12. It should be noted that only portions of the second embodiment in which it differs from the first embodiment will be described below, and the same portions as those in the first embodiment are denoted by the same reference characters.

In the second embodiment, timing at which a jerk (rate of change of acceleration) will occur at the rear end of the vehicle is estimated from the front jerk occurrence timing, together with the vehicle speed and the wheelbase, thereby performing corrective control. More specifically, a front jerk information computation (measurement of front jerk occurrence timing) and a rear correction timing computation (estimation of the timing of occurrence of a jerk at the rear end of the vehicle) are executed at steps 708a and 708b in the main flowchart shown in FIG. 10. It should be noted that the other steps (processing) are the same as those in the first embodiment, and a description thereof is omitted.

The details of the front jerk information computation at step 708a will be described below with reference to FIG. 11.

At steps 801 through 806, a jerk correction value YJR(L) for the rear variable-damping coefficient shock absorber 103RL(R) is calculated as in the case of the first embodiment. Subsequently, the jerk duration timer start flag is cleared (jerk duration timer start flag=0) at step 807. Then, it is judged at step 808 whether or not the jerk correction value YJR(L) in the previous control cycle (ZYJR(L)) is 1. If NO is the result of the judgment (ZYJR(L)=/1), the process proceeds to step 812. If YES is the result of the judgment (ZYJR(L)=1), the process proceeds to step 809, at which a judgment is made as to whether or not the jerk correction value YJR(L) obtained at steps 801 through 806 is a value other than 1. If NO is the result of the judgment at step 809 (YJR(L)=1), the process proceeds to step 814, at which a jerk correction value YJR(L) equal to that in the previous control cycle is set (ZYJR(L)=YJR(L)).

If YES is the result of the judgment at step 809 (YJR(L)=/1), the jerk duration timer is cleared (jerk duration timer=0) at step 810. Subsequently, the jerk duration timer start flag is set (jerk duration timer start flag=1) at step 811. Then, the process proceeds to step 814, at which a jerk correction value YJR(L) equal to that in the previous control cycle is set (ZYJR(L)=YJR(L)).

At step 812, a judgment is made as to whether or not the jerk correction value YJR(L) is 1. If NO is the result of the judgment (YJR(L)=/1), it is judged that the jerk is now continuously occurring, and the count of the jerk duration timer is incremented by 1 (for one cycle) at step 813. Then, the process proceeds to step 814, at which a jerk correction value YJR(L) equal to that in the previous control cycle is set (ZYJR(L)=YJR(L)). If YES is the result of the judgment at step 812 (YJR(L)=1), the process proceeds to step 814, at which a jerk correction value YJR(L) equal to that in the previous control cycle is set (ZYJR(L)=YJR(L)).

Thus, at step 708a, timing at which a jerk occurred at the front end of the vehicle is detected, and how long the jerk has been continuing is measured with the jerk duration timer.

Next, the details of the rear correction timing computation at step 708b will be described with reference to FIG. 12.

It is judged at step 901 whether or not the jerk duration timer start flag has been set (jerk duration timer start flag=1).

If NO is the result of the judgment at step 901 (jerk duration timer start flag=/1), the process proceeds to step 904. If YES is the result of the judgment at step 901 (jerk duration timer start flag=1), the setting of the jerk timer (decision of a set value T) is made on the basis of the wheelbase of the vehicle and the vehicle speed at the following step 902. Subsequently, the rear jerk timer start flag is set (rear jerk timer start flag=1) at step 903.

It is judged at step 904 whether or not the rear jerk timer start flag has been set (=1). If NO is the result of the judgment (rear jerk timer start flag=/1), the process proceeds to step 908. If YES is the result of the judgment at step 904 (rear jerk timer start flag=1), the count of the rear jerk timer is incremented by 1 (for one cycle) at step 905. Then, the process proceeds to step 906, at which a judgment is made as to whether or not the rear jerk timer has a value equal to or larger than the set value T. If NO is the result of the judgment at step 906 (rear jerk timer<set value T), the process proceeds to step 908. If YES is the result of the judgment (rear jerk timer>_ set value T), the rear jerk timing flag is set (=1) and the rear jerk timer start flag is cleared (=0) at the following step 907.

It is judged at step 908 whether or not the rear jerk timing flag has been set (=1). If NO is the result of the judgment (rear jerk timing flag=/1), the process proceeds to step 914, at which the jerk correction value YJR(L) is set equal to 1. If YES is the result of the judgment (rear jerk timing flag=1), the count of the rear jerk timing timer is incremented by 1 (for one cycle) at step 909. Then, the process proceeds to step 910.

It is judged at step 910 whether or not the rear jerk timing timer has a value equal to or smaller than the value of jerk duration timer. If NO is the result of the judgment (rear jerk timing timer>jerk duration timer), the process proceeds to step 912, at which both the rear jerk timing timer and the rear jerk timing flag are cleared (=0). Then, the jerk correction value YJR(L) is set equal to 1. If YES is the result of the judgment (rear jerk timing timer<_ jerk duration timer), the jerk correction value YJR(L) is set equal to the smaller value of KJR(L) obtained in the processing shown in FIG. 11.

As stated above, according to the second embodiment, a jerk duration is obtained by the front jerk information computation at step 708*a*, and timing at which a jerk will occur at the rear end is estimated at step 708*b* with the jerk timing timer from the present vehicle speed and the wheelbase of the vehicle. When the rear end of the vehicle is at the jerk occurrence timing, the correction coefficient (jerk correction value YJR(L)) is set equal to the value obtained at step 708*a*, thereby preventing the occurrence of a jerk at the rear end of the vehicle. Thus, because the jerk occurrence timing at the rear end of the vehicle and the jerk duration are computed, the controlled variable for the damping coefficient of the rear variable-damping coefficient shock absorber can be corrected without missing the right timing to drive the actuator. Moreover, because the damping coefficient capable of preventing a jerk is maintained during the duration of the jerk, the occupant can be even more reliably prevented from feeling a sensation of being thrown out upwardly or strongly pressed against the seat.

Next, a third embodiment of the present invention will be described with reference to FIGS. 13 to 16. In the third embodiment, the controlled variable for the rear variable-damping force shock absorber is corrected on the basis of the sprung acceleration (signal). It should be noted that in the first embodiment a jerk (acceleration change rate) is obtained from the sprung acceleration (signal), and the controlled variable for the rear variable-damping force shock absorber is corrected on the basis of the jerk. In this regard, the third embodiment differs from the first embodiment. In the following, only portions of the third embodiment in which it is different from the first embodiment will be described. It should be noted that the same portions as those in the first embodiment are denoted by the same reference characters.

Figure 13:
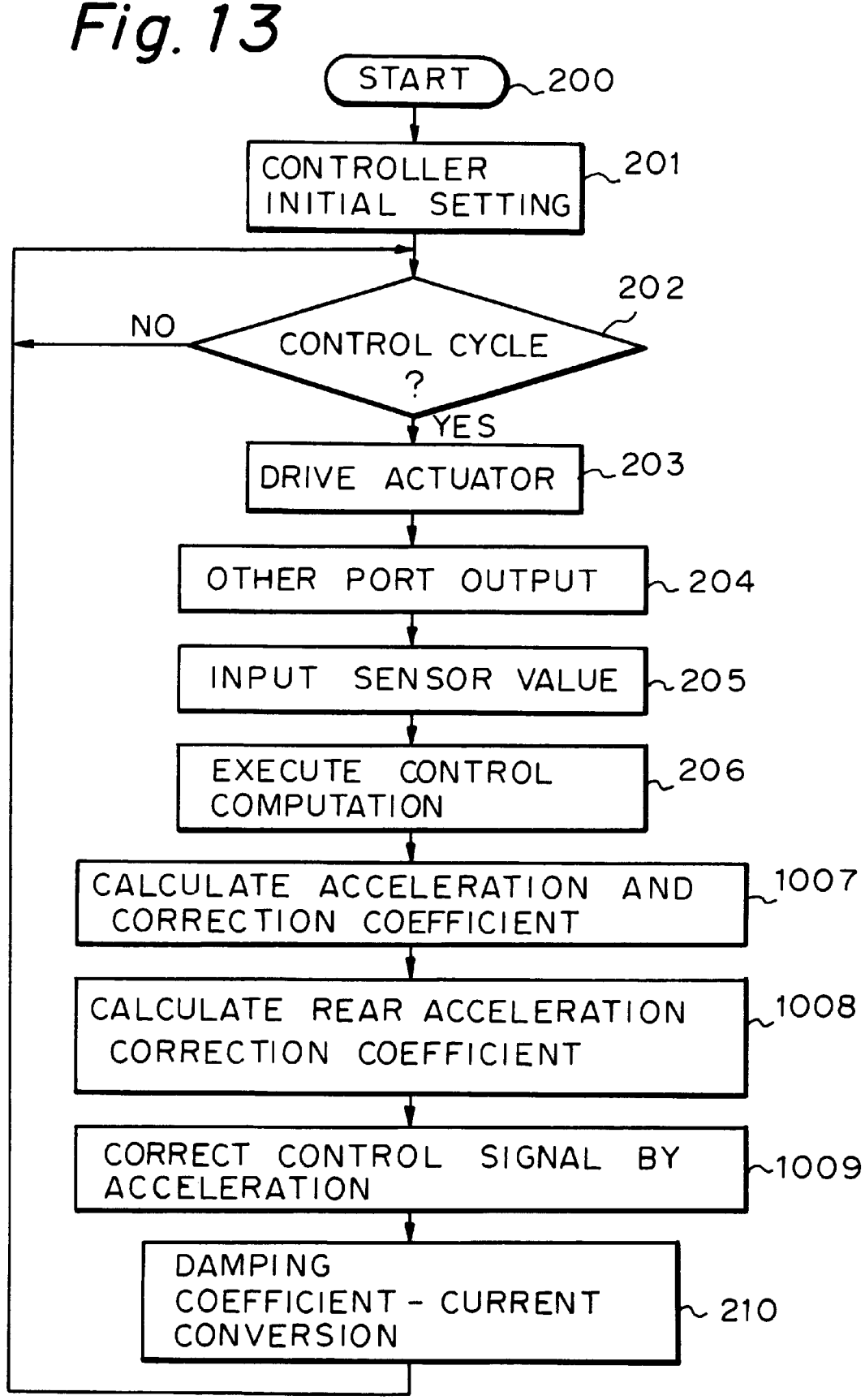
FIG. 13 is a main flowchart showing a control procedure according to a third embodiment of the present invention.
Figure 14:
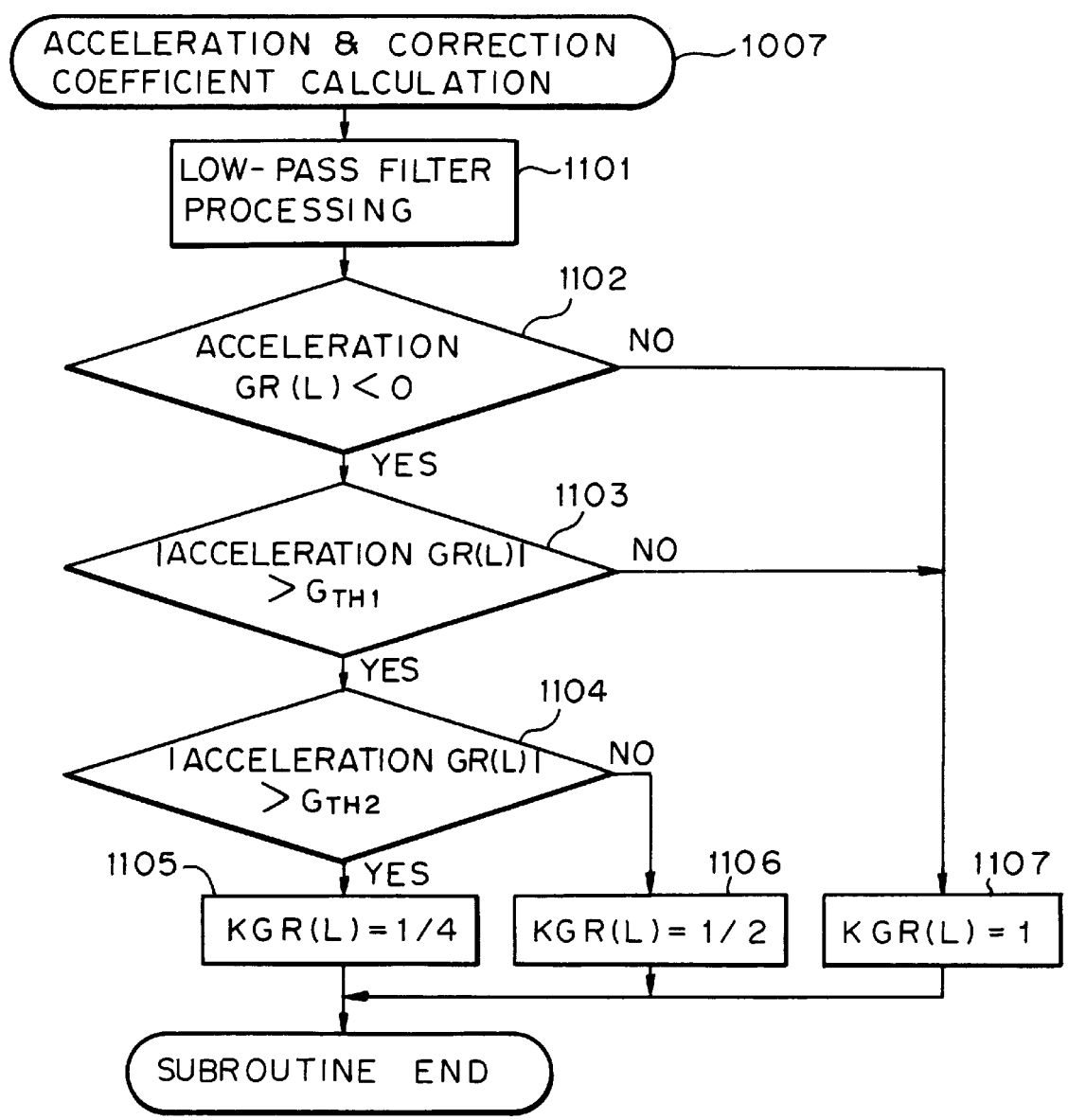
FIG. 14 is a flowchart showing the details of acceleration correction coefficient calculation in FIG. 13.

First, the details of the calculation of an acceleration and a correction coefficient at step 1007 in FIG. 13, in which the third embodiment differs from the first embodiment, will be described with reference to FIG. 14.

First, low-pass filter processing is executed on the basis of a sprung acceleration (signal) αFL(R) (at the front end) outputted from the front acceleration sensor 104FL(R) to cut off a high-frequency noise component from the signal (step 1101). In the third embodiment, correction is made with respect to the downward acceleration αFL(R) (the downward acceleration acting on the vehicle body when the vehicle has reached the top of an undulation), thereby preventing the occupant from feeling a sensation of being thrown out upwardly. Therefore, it is judged at step 1102 whether or not the sprung acceleration GR(L) subjected to the low-pass filter processing at step 1101 is smaller than 0 (step 1102). If the result of the judgment is NO, the sprung acceleration correction gain KGR(L) is set equal to 1, and this is outputted to the control gain deciding part 40*a* so that the controlled variable is equal to the value assumed during the normal running (in which the uncorrected control command signal C' obtained in the absolute velocity calculating part B is not corrected; the corrected control command signal C is set equal to the uncorrected control command signal C') (step 1107).

If the result of the judgment at step 1102 is YES, i.e. if the sprung acceleration GR(L) is smaller than 0, the process proceeds to step 1103, at which a judgment is made as to whether or not the absolute value of the sprung acceleration GR(L) is larger than a first threshold value GTH1 of sprung acceleration. If the absolute value of the sprung acceleration GR(L) is not larger than the first threshold value GTH1 of sprung acceleration (if NO), the process proceeds to step 1107, at which the sprung acceleration correction gain KGR(L) is set equal to 1, and this is outputted to the control gain deciding part 40*a* so that the controlled variable is equal to the value assumed during the normal running (the corrected control command signal C=the uncorrected control command signal C').

If it is judged at step 1103 that the absolute value of the sprung acceleration GR(L) is larger than the first threshold value GTH1 of sprung acceleration (if YES), the process proceeds to step 1104, at which a judgment is made as to whether or not the absolute value of the sprung acceleration GR(L) is larger than a second threshold value GTH2, which is larger than the first threshold value GTH1 of sprung acceleration (GTH1<GTH2). If the absolute value of the sprung acceleration GR(L) is not larger than the second threshold value GTH2 (if NO), the process proceeds to step 1106, at which the sprung acceleration correction gain KGR(L) is set equal to ½, and this is outputted to the control gain deciding part 40*a* so that the controlled variable becomes ½ of the value assumed during the normal running (i.e. C=½·C'). If it is judged at step 1104 that the absolute value of the sprung acceleration GR(L) is larger than the second threshold value GTH2 (if YES), the process proceeds to step 1105, at which the sprung acceleration correction gain KGR(L) is set equal to ¼, and this is outputted to the control gain deciding part 40*a* so that the controlled variable becomes ¼ of the value assumed during the normal running (i.e. C=¼·C'). The first and second threshold values GTH1 and GTH2 of sprung acceleration have previously been stored in the correction gain selecting unit 47a. This is schematically shown in the map (selection map) in the correction gain selecting unit 47a in FIG. 16.

Figure 15:
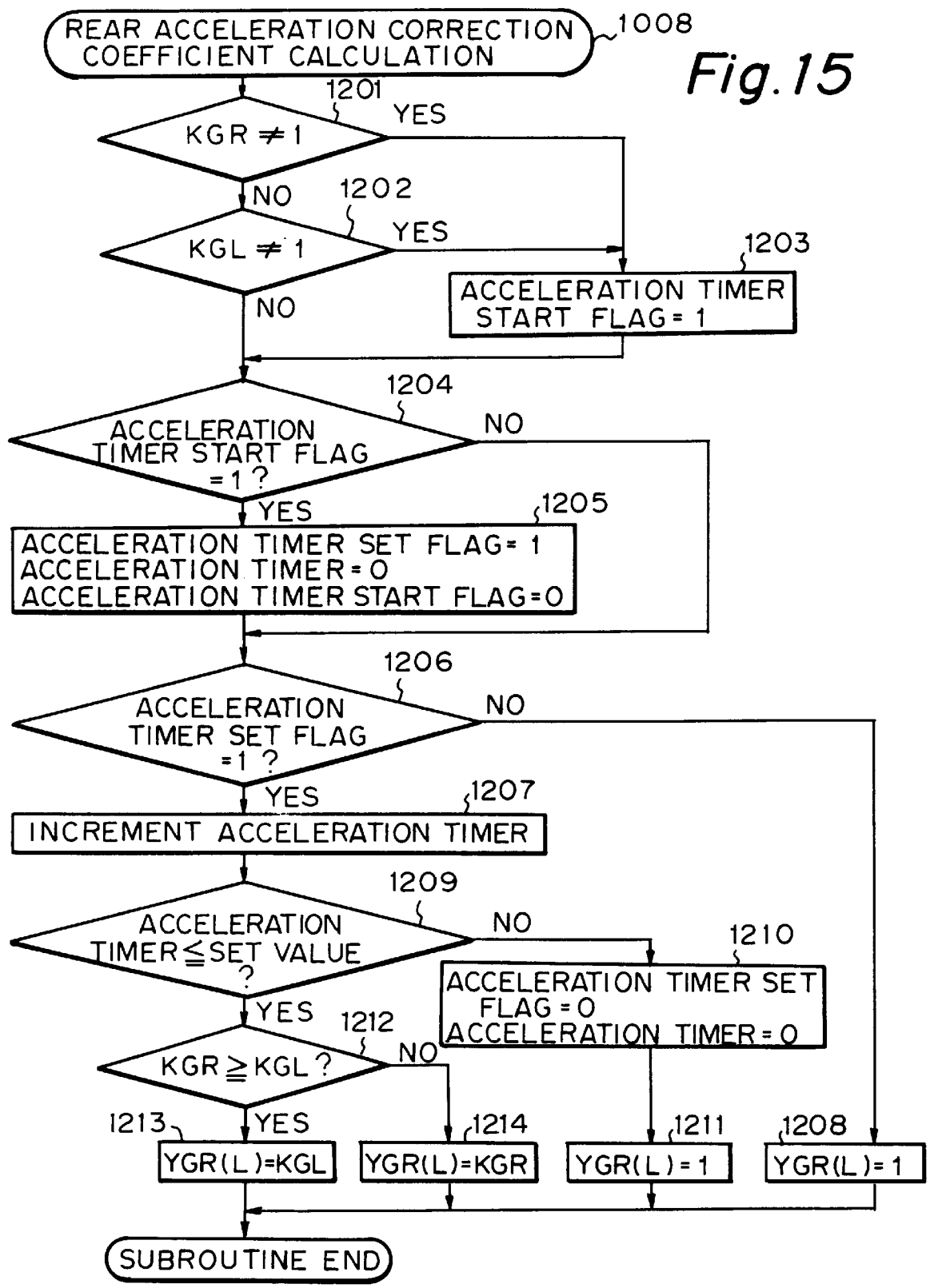
FIG. 15 is a flowchart showing the details of rear acceleration correction coefficient calculation in FIG. 13.
Figure 16:
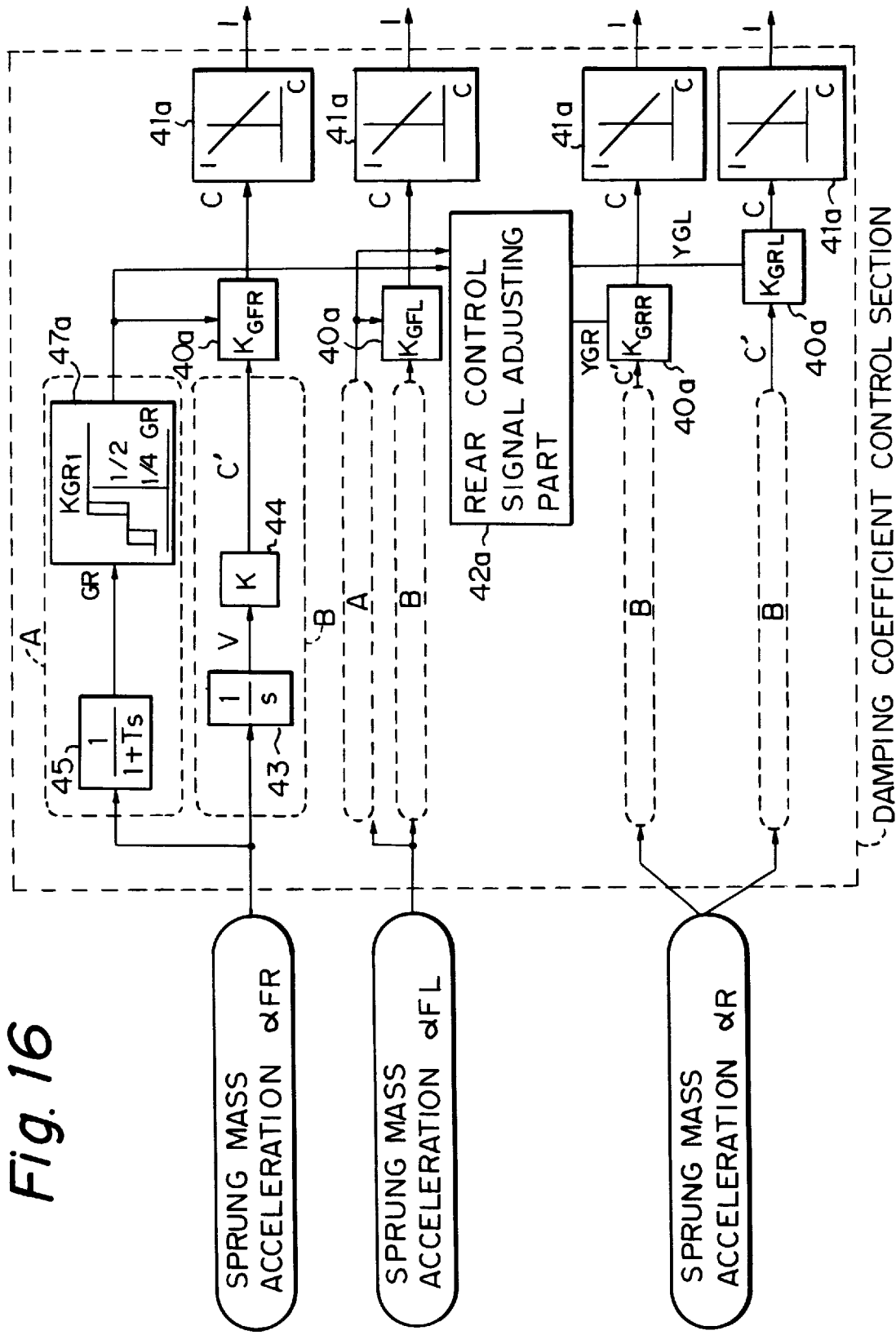
FIG. 16 is a block diagram showing a control system according to the third embodiment of the present invention.

Next, the details of the rear acceleration correction coefficient calculation at step 1008 in FIG. 13 will be described with reference to FIG. 15.

At steps 1201 and 1202, it is judged whether not the sprung acceleration correction gain KGR(L) (one of the three values: 1, ½ and ¼) obtained by the above-described judgment on the basis of the sprung acceleration αFL(R) (at the front end) is a value other than 1 (KGR(L)=/1, or KGR=/1 and KGL=1, or KGR=1 and KGL=/1). If the result of the judgment is YES (if KGR(L)=½ or KGR(L)=¼), the acceleration timer start flag is set (acceleration timer start flag=1) (step 1203), and then the process proceeds to step 1204. If the results of the judgment at steps 1201 and 1202 are NO (KGR(L)=1), the acceleration timer start flag is not set (acceleration timer start flag=0), and then the process proceeds to step 1204.

At step 1204, it is judged whether or not the acceleration timer start flag is 1. If the acceleration timer start flag is judged to be 1 (if YES), step 1205 is executed to prepare for starting the timer. If it is judged at step 1204 that the acceleration timer start flag is 0 (if NO), the process proceeds to step 1206. If it is judged at step 1206 that the acceleration timer set flag is 1, the acceleration timer is incremented (step 1207). If the acceleration timer set flag is judged to be 0 at step 1206, the acceleration correction value YGR(L) (a predetermined value for adjusting the uncorrected control command signal C') is set equal to 1, and correction of the controlled variable is not made (step 1208). That is, the controlled variable is equal to the value assumed during the normal running, i.e. the uncorrected control command signal C' is equal to the corrected control command signal C.

At step 1209, it is judged whether or not the acceleration timer has a value equal to or smaller than a set value. If the value of the acceleration timer is larger than the set value (if NO), the process proceeds to step 1210, at which both the acceleration timer set flag and the acceleration timer are cleared (=0). Then, the acceleration correction value YGR (L) is set equal to 1 at step 1211. If the value of the acceleration timer is equal to or smaller than the set value (if YES) at step 1209, a size comparison is made at step 1212 between the acceleration correction gains KGR and KGL for the front right and left wheels to judge whether or not KGR assumes a value equal to or larger than KGL. If NO is the result of the judgment at step 1212 (if KGR<KGL), the acceleration correction gain KGR, which is smaller than the other, is decided to be an acceleration correction value (YGR(L)=KGR). If YES is the result of the judgment at step 1212 (if KGR>=KGL), the acceleration correction gain KGL, which is smaller than the other, is decided to be an acceleration correction value (YGR(L)=KGL).

Thus, the rear control signal adjusting part 42a obtains the acceleration correction value YGR(L) (for the rear end) from the acceleration correction gain KGR(L) obtained on the basis of the sprung acceleration αFL(R) (at the front end), and outputs the acceleration correction value YGR(L) to each control gain deciding part 40a (for the rear end). The control gain deciding part 40a multiplies the uncorrected control command signal C' by the acceleration correction value YGR(L) (one of the three values: 1, ½ and ¼) to output a corrected control command signal C (coefficient KGRR (L)). The corrected control command signal C thus obtained is outputted to the damping coefficient-current converting part 41a (for the rear end). The damping coefficient-current converting part 41a decides a control signal I on the basis of the corrected control command signal C.

Regarding the operation of the suspension control system according to the third embodiment, arranged as described above, the command signal sent to the actuator 34 to adjust the damping coefficient is corrected on the basis of the acceleration, whereas in the first embodiment the command signal to the actuator 34 is corrected on the basis of the rate of change of acceleration. The control procedure in the third embodiment is substantially the same as that in the first embodiment; therefore, a description thereof is omitted. Regarding advantageous effects attained by the third embodiment, it is possible to prevent speedily and reliably the occupant from feeling a sensation of being thrown out upwardly, as in the case of the first embodiment. In particular, an advantageous effect is obtained for the occupant located at the rear end of the vehicle body 100. In addition, because there is no need of calculating a jerk (rate of change of acceleration), the weight of the controller (circuit) can be correspondingly reduced in comparison to the first embodiment.

Although in the third embodiment correction is made with respect to the downward acceleration (acceleration acting downwardly on the vehicle body when the vehicle has reached the top of the undulation) to prevent the occupant from feeling a sensation of being thrown out upwardly, the arrangement may be such that correction is made with respect to the upward acceleration (acceleration acting upwardly on the vehicle body when the vehicle has reached the bottom of the undulation) as in the modification of the first embodiment. In this case, the occupant can be reliably prevented from feeling a sensation of being strongly pressed against the seat.

Figure 17:
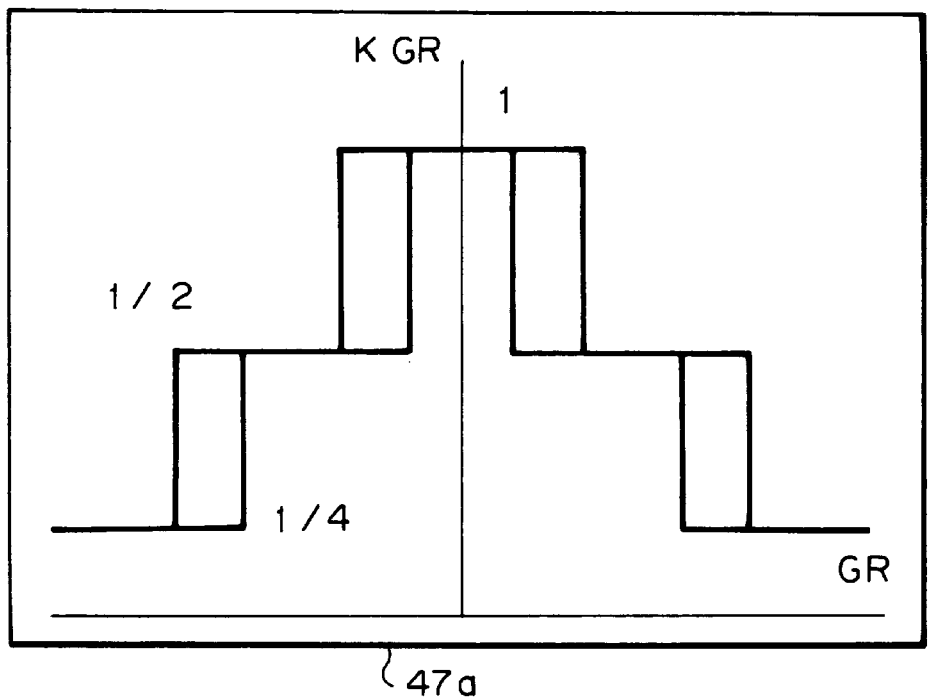
FIG. 17 is a map showing a modification of a correction gain calculating unit in a jerk calculating part A of the control system shown in FIG. 16.
Figure 18:
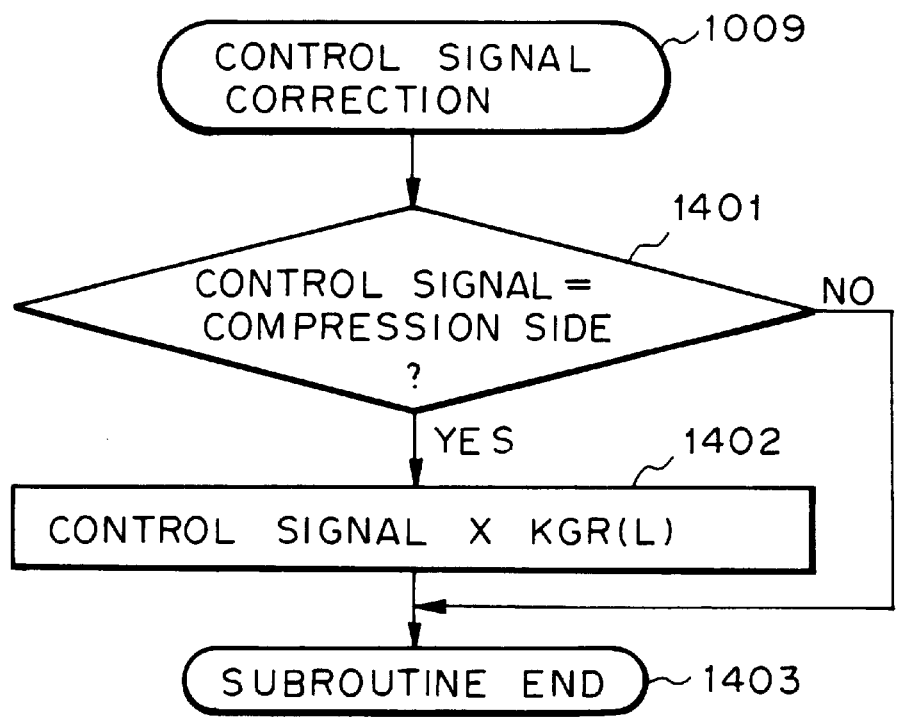
FIG. 18 is a flowchart showing a computing procedure according to the modification shown in FIG. 17.

A modification of the third embodiment will be described below with reference to FIGS. 17 and 18. FIG. 17 shows a correction gain calculating unit in a control block according to the modification. The correction gain calculating unit differs only in the structure of selection map from the correction gain calculating unit 47a in the acceleration calculating part A shown in FIG. 16. More specifically, the correction gain calculating unit differs from the correction gain calculating unit 47a in the third embodiment in that the acceleration GR(L) has the first and second threshold values also in the positive region of the selection map (the right-hand half of the map). Accordingly, when the acceleration GR(L) obtained after the low-pass filter processing of the vertical acceleration αFL(R) detected by the acceleration sensor 104FL(R) is positive (which means that an upward acceleration has occurred), the acceleration GR(L) is compared with the first and second threshold values in the positive region, and consequently, the damping coefficient control section drives the actuator 34 in a direction reverse to that in the case of the downward acceleration, thereby reliably preventing the occupant from feeling a sensation of being strongly pressed against the seat.

The control procedure according to the above-described modification will be described below. Control signal correcting processing (the correction of the extension-side damping coefficient obtained on the basis of the calculation by the acceleration calculating part A) is executed at step 1009 in FIG. 13. The details of the control at step 1009 are shown in FIG. 18. At step 1401, it is judged whether or not the present control signal is for the contraction side. If NO is the result of the judgment at step 1401 (control signal= extension side), the contraction side has already been brought into soft characteristic conditions. Therefore, no correction is needed, and the process proceeds to step 1403, at which the control according to the above-described embodiment is executed. If YES is the result of the judgment at step 1401, (control signal=contraction side), the process proceeds to step 1402, at which the control signal is multiplied by the acceleration correction gain KGR(L) obtained at step 1007 in FIG. 13 to correct the control command signal C in order to suppress an acceleration (upward) occurring due to the contraction hard characteristics.

By virtue of the above arrangement, the controlled variable for adjusting the damping force can be corrected also with respect to the upward acceleration (acceleration acting upwardly on the vehicle body when the vehicle has reached the bottom of the undulation). Accordingly, it is possible to reliably prevent the occupant from feeling a sensation of being strongly pressed against the seat when the vehicle has reached the bottom of the undulation.

Figure 19:
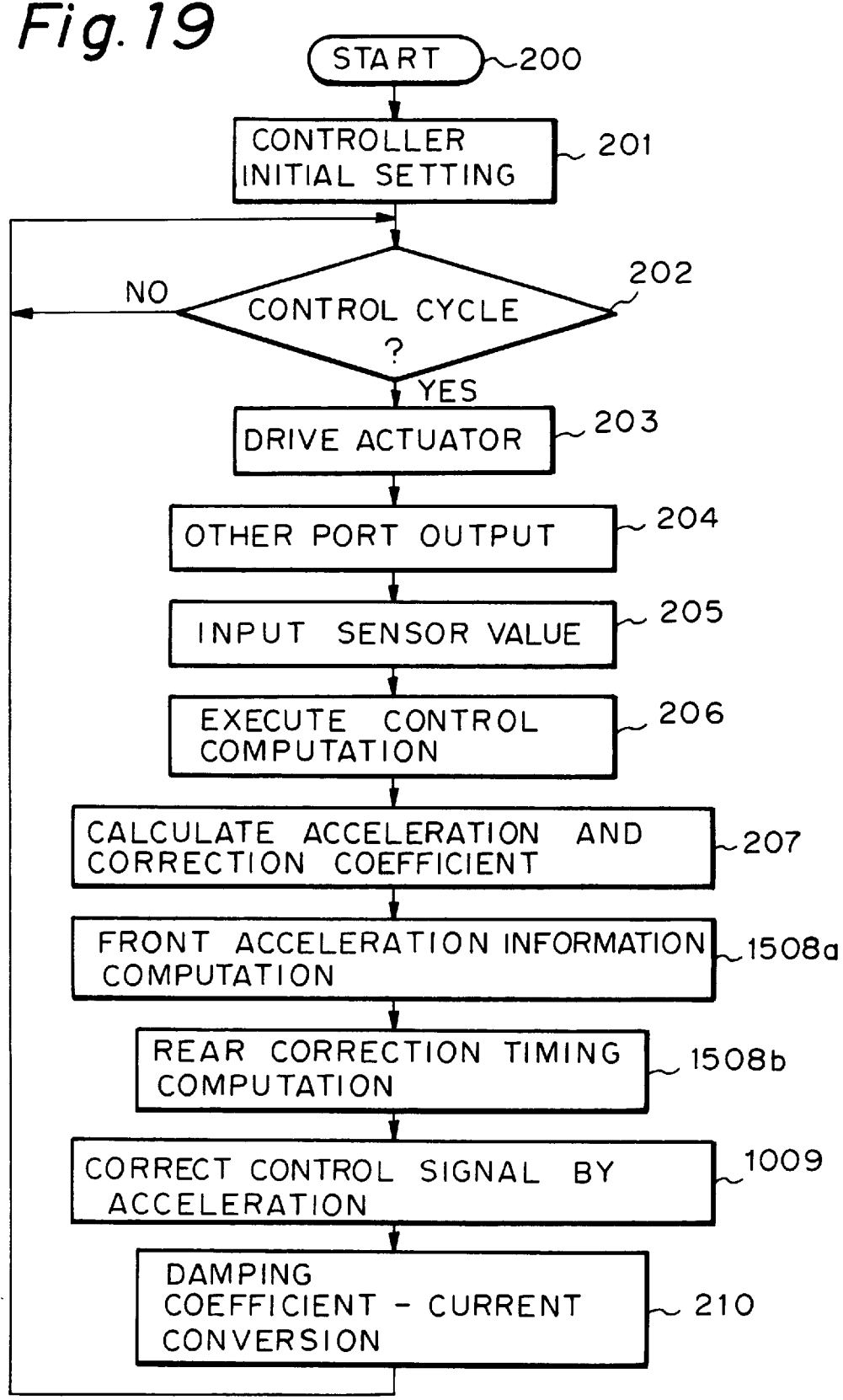
FIG. 19 is a main flowchart showing a control procedure according to a fourth embodiment of the present invention.
Figure 20:
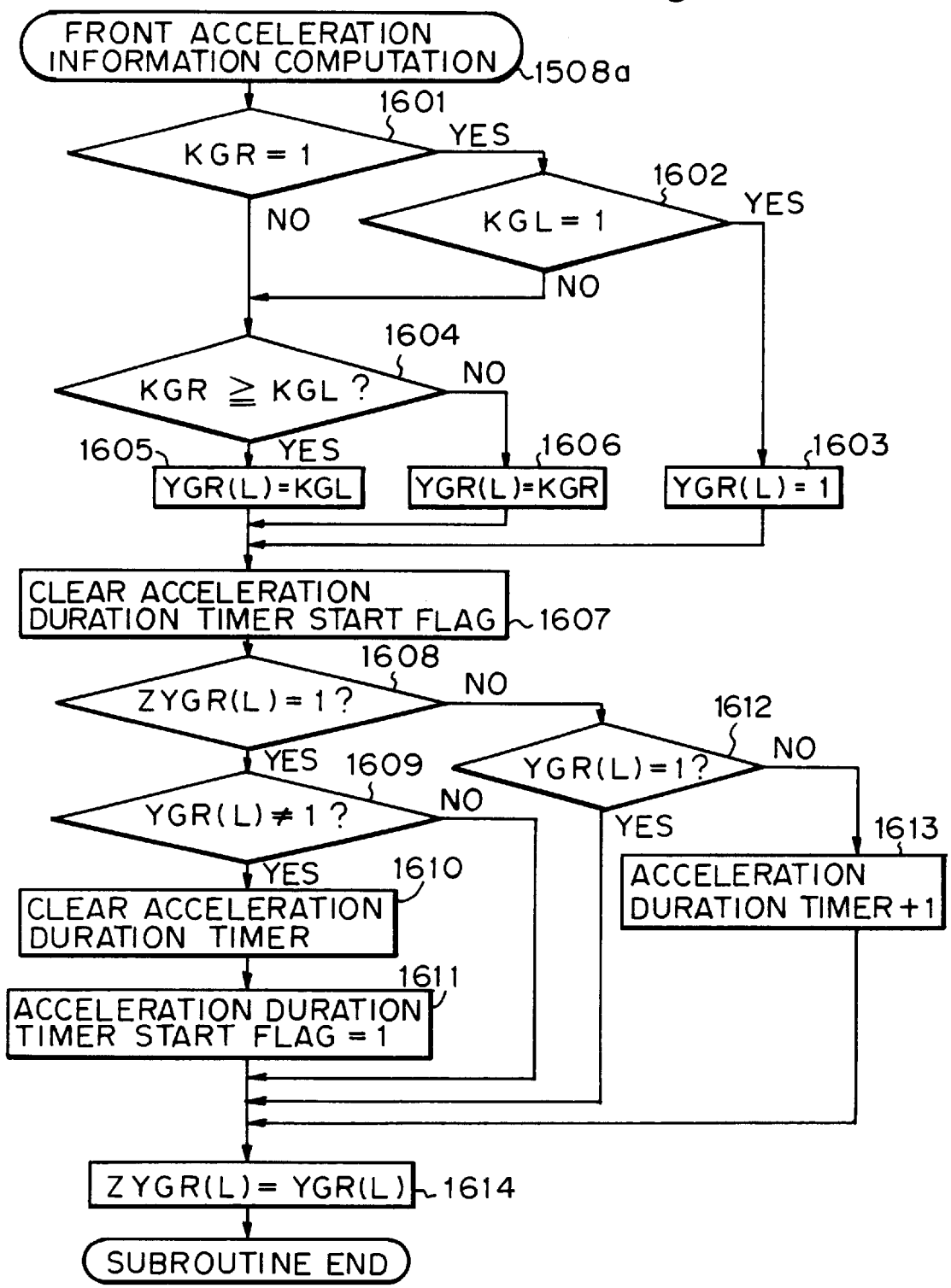
FIG. 20 is a flowchart showing the details of front acceleration information computation in FIG. 19.
Figure 21:
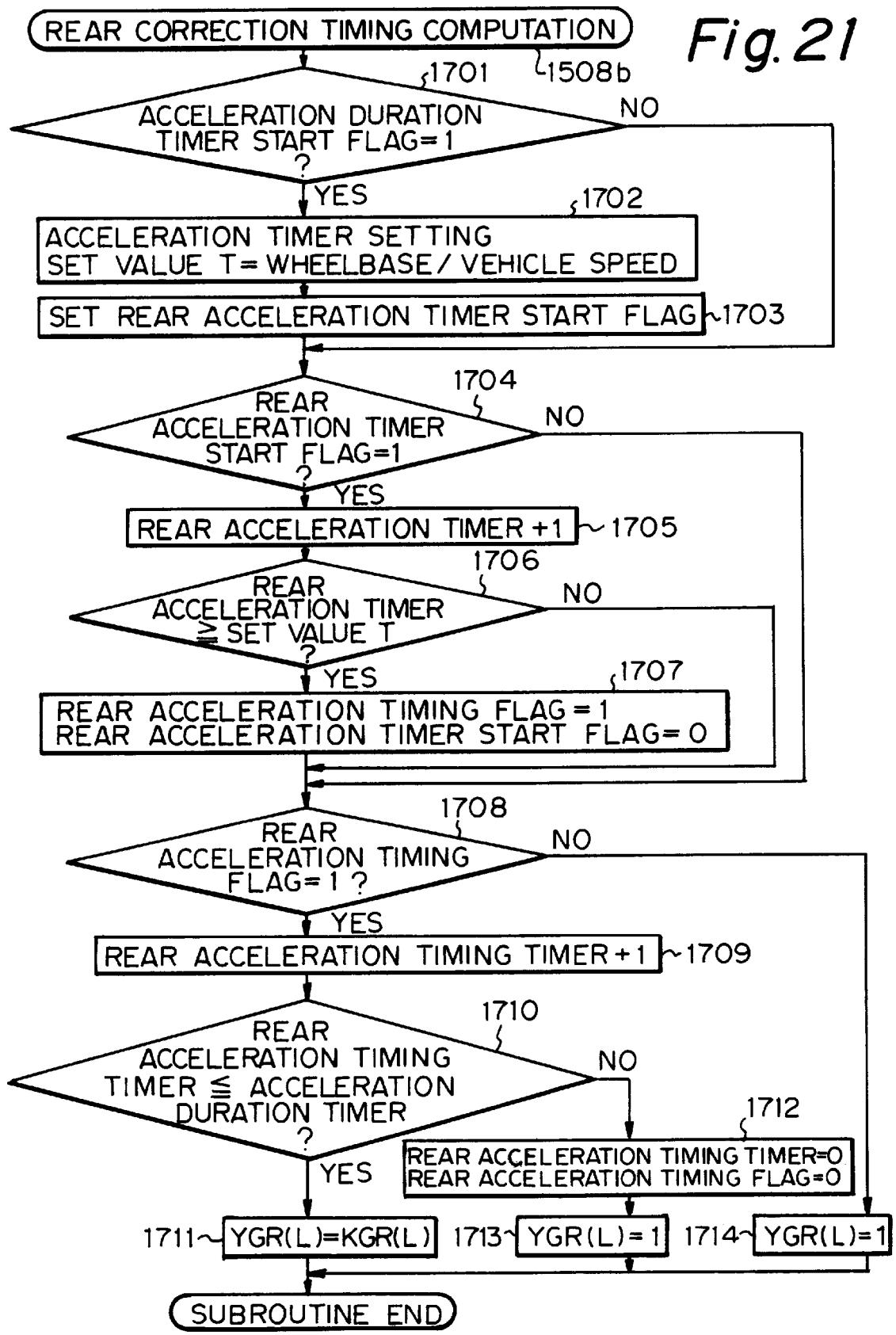
FIG. 21 is a flowchart showing the details of rear correction timing computation in FIG. 19.

Next, a fourth embodiment of the present invention will be described with reference to FIGS. 19 to 21. It should be noted that only portions of the fourth embodiment in which it differs from the third embodiment will be described below, and the same portions as those in the third embodiment are denoted by the same reference characters.

In the fourth embodiment, timing at which an acceleration will occur at the rear end of the vehicle is estimated from the front acceleration occurrence timing, together with the vehicle speed and the wheelbase, thereby performing corrective control. More specifically, a front acceleration information computation (measurement of front acceleration occurrence timing) and a rear correction timing computation (estimation of timing of occurrence of an acceleration at the rear end of the vehicle) are executed at steps 1508*a* and 1508*b* in the main flowchart shown in FIG. 19. It should be noted that the other steps (processing) are the same as those in the third embodiment, and a description thereof is omitted.

The details of the front acceleration information computation at step 1508*a* will be described below with reference to FIG. 20.

At steps 1601 through 1606, an acceleration correction value YGR(L) for the rear variable-damping coefficient shock absorber 103RL(R) is calculated as in the case of the third embodiment. Subsequently, the acceleration duration timer start flag is cleared (acceleration duration timer start flag=0) at step 1607. Then, it is judged at step 1608 whether or not the acceleration correction value YGR(L) (ZYGR(L)) in the previous control cycle is 1. If NO is the result of the judgment (ZYGR(L)=/1), the process proceeds to step 1612. If YES is the result of the judgment (ZYGR(L)=1), the process proceeds to step 1609, at which a judgment is made as to whether or not the acceleration correction value YGR (L) obtained at steps 1601 through 1606 is a value other than 1. If NO is the result of the judgment at step 1609 (YGR (L)=1), the process proceeds to step 1614, at which an acceleration correction value YGR(L) equal to that in the previous control cycle is set (ZYGR(L)=YGR(L)).

If YES is the result of the judgment at step 1609 (YGR (L)=/1), the acceleration duration timer is cleared (acceleration duration timer=0) at step 1610. Subsequently, the acceleration duration timer start flag is set (acceleration duration timer start flag=1) at step 1611. Then, the process proceeds to step 1614, at which an acceleration correction value YGR(L) equal to that in the previous control cycle is set (ZYGR(L)=YGR(L)).

At step 1612, a judgment is made as to whether or not the acceleration correction value YGR(L) is 1. If NO is the result of the judgment (YGR(L)=/1), it is judged that the acceleration is now continuously occurring, and the count of the acceleration duration timer is incremented by 1 (for one cycle) at step 1613. Then, the process proceeds to step 1614, at which an acceleration correction value YGR(L) equal to that in the previous control cycle is set (ZYGR(L)=YGR (L)). If YES is the result of the judgment at step 1612 (YGR(L)=1), the process proceeds to step 1614, at which an acceleration correction value YGR(L) equal to that in the previous control cycle is set (ZYGR(L)=YGR(L)).

Thus, at step 1508*a*, timing at which an acceleration occurred at the front end of the vehicle is detected, and how long the acceleration has been continuing is measured with the acceleration duration timer.

Next, the details of the rear correction timing computation at step 1508*b* will be described with reference to FIG. 21.

It is judged at step 1701 whether or not the acceleration duration timer start flag has been set (acceleration duration timer start flag=1). If NO is the result of the judgment at step 1701 (acceleration duration timer start flag=/1), the process proceeds to step 1704. If YES is the result of the judgment at step 1701 (acceleration duration timer start flag=1), the setting of the acceleration timer (decision of a set value T) is made on the basis of the wheelbase of the vehicle and the vehicle speed at the following step 1702. Subsequently, the rear acceleration timer start flag is set (rear acceleration timer start flag=1) at step 1703.

It is judged at step 1704 whether or not the rear acceleration timer start flag has been set (=1). If NO is the result of the judgment (rear acceleration timer start flag=/1), the process proceeds to step 1708. If YES is the result of the judgment at step 1704 (rear acceleration timer start flag=1), the count of the rear acceleration timer is incremented by 1 (for one cycle) at step 1705. Then, the process proceeds to step 1706, at which a judgment is made as to whether or not the rear acceleration timer has a value equal to or larger than the set value T. If NO is the result of the judgment at step 1706 (rear acceleration timer<set value T), the process proceeds to step 1708. If YES is the result of the judgment (rear acceleration timer>=set value T), the rear acceleration timing flag is set (=1) and the rear acceleration timer start flag is cleared (=0) at the following step 1707.

It is judged at step 1708 whether or not the rear acceleration timing flag has been set (=1). If NO is the result of the judgment (rear acceleration timing flag=/1), the process proceeds to step 1714, at which the acceleration correction value YGR(L) is set equal to 1. If YES is the result of the judgment (rear acceleration timing flag=1), the count of the rear acceleration timing timer is incremented by 1 (for one cycle) at step 1709. Then, the process proceeds to step 1710.

It is judged at step 1710 whether or not the rear acceleration timing timer has a value equal to or smaller than the value of acceleration duration timer. If NO is the result of the judgment (rear acceleration timing timer>acceleration duration timer), the process proceeds to step 1712, at which both the rear acceleration timing timer and the rear acceleration timing flag are cleared (=0). Then, the acceleration correction value YGR(L) is set equal to 1. If YES is the result of the judgment (rear acceleration timing timer<_ acceleration duration timer), the acceleration correction value YGR(L) is set equal to the smaller value of KGR(L) obtained in the processing shown in FIG. 16.

As stated above, according to the fourth embodiment, an acceleration duration is obtained by the front acceleration information computation at step 1508a, and timing at which an acceleration will occur at the rear end is estimated at step 1508b with the acceleration timing timer from the present vehicle speed and the wheelbase of the vehicle. When the rear end of the vehicle is at the acceleration occurrence timing, the correction coefficient (acceleration correction value YGR(L)) is set equal to the value obtained at step 1508a, thereby preventing the occurrence of an acceleration at the rear end of the vehicle. Thus, because the acceleration occurrence timing at the rear end of the vehicle and the acceleration duration are computed, the controlled variable for the damping coefficient of the rear variable-damping coefficient shock absorber can be corrected without missing the right timing to drive the actuator. Moreover, because the damping coefficient capable of preventing the occurrence of an acceleration is maintained during the duration of the acceleration, it is possible to prevent even more reliably the occupant from feeling a sensation of being thrown out upwardly or strongly pressed against the seat.

Although the foregoing embodiments use only two threshold values (JTH1 and JTH2) of jerk or acceleration, it should be noted that the number of threshold values is not necessarily limited to two, and that a plurality (n) of threshold values may be set. If the number of threshold values is more than two, finer correction control can be performed.

Although only one rear acceleration sensor is mounted, the number of rear acceleration sensors is not necessarily limited to one. A plurality of acceleration sensors may be provided in one-to-one correspondence to wheels (in the case of ordinary automobiles, one for each of four wheels, i.e. a total of four). In this case, finer correction control can be performed under any road surface conditions.

As has been detailed above, according to the present invention, when the front vertical acceleration or the rate of change of the front vertical acceleration exceeds a preset reference value, the damping force of the rear variable-damping force shock absorber can be reduced. Therefore, it is possible to reliably prevent the occupant from feeling a sensation of being thrown out upwardly or strongly pressed against the seat when the vehicle has reached the top or bottom of an undulation of the road surface, particularly at the rear end of the vehicle where the shock absorber is likely to be disposed near the occupant.

When the front vertical acceleration or the rate of change of the front vertical acceleration exceeds a preset reference value, a state where the damping force of the rear variable-damping force shock absorber is reduced can be continued for a predetermined period of time. Accordingly, it is possible to drive the actuator by correcting the controlled variable for the damping force of the rear variable-damping force shock absorber and to maintain this state. Therefore, the occupant can be even more reliably prevented from feeling a sensation of being thrown out upwardly or strongly pressed against the seat.

When the front vertical acceleration or the rate of change of the front vertical acceleration exceeds a preset reference value, timing at which the rear sprung vertical acceleration or the rate of change of the rear sprung vertical acceleration increases is computed on the basis of the vehicle speed, and thus the damping force of the rear variable-damping force shock absorber can be reduced at that timing. Accordingly, the controlled variable for the damping force of the rear variable-damping force shock absorber can be corrected without missing the right timing to drive the actuator. Thus, the occupant can be even more reliably prevented from feeling a sensation of being thrown out upwardly or strongly pressed against the seat.

What is claimed is:

1. A suspension control system comprising:

a front and rear variable-damping force shock absorbers interposed between a sprung member and respective unsprung members at front and rear ends of a vehicle;

actuators for adjusting damping forces of said front and rear variable-damping force shock absorbers, respectively;

front and rear vertical acceleration detecting means for respectively detecting vertical accelerations at front and rear ends of said sprung member; and damping force control means that sends control signals to said actuators to adjust the damping forces according to the vertical accelerations detected by said front and rear vertical acceleration detecting means;

said damping force control means having a vertical acceleration change rate calculating part that obtains a rate of change of vertical acceleration on the basis of the vertical acceleration detected by said front vertical acceleration detecting means; and control signal adjusting means that adjusts a control signal for the rear variable-damping force shock absorber such that the damping force of said rear variable-damping force shock absorber is reduced when the rate of change of vertical acceleration calculated by said vertical acceleration change rate calculating part exceeds a preset vertical acceleration change rate reference value.

2. A suspension control system according to claim 1, wherein, when the rate of change of vertical acceleration calculated by said vertical acceleration change rate calculating part exceeds a preset vertical acceleration change rate reference value, said control signal adjusting means sends a control signal to said actuator for said rear variable-damping force shock absorber so that a state where the damping force of said rear variable-damping force shock absorber is reduced is continued for a predetermined period of time.

3. A suspension control system according to claim 1, further comprising vehicle speed detecting means for detecting a speed of said vehicle, wherein when the vertical acceleration change rate calculated by said vertical acceleration change rate calculating part exceeds a preset vertical acceleration change rate reference value, said control signal adjusting means computes timing at which a rate of change of vertical acceleration at the rear end of said sprung member increases on the basis of the vehicle speed detected by said vehicle speed detecting means, and sends a control signal to said actuator for said rear variable-damping force shock absorber so that the damping force of said rear variable-damping force shock absorber is reduced at said timing.

* * * * *